(12) United States Patent
Kobayashi et al.

(10) Patent No.: US 11,994,197 B2
(45) Date of Patent: May 28, 2024

(54) TRANSMISSION DEVICE

(71) Applicants: JATCO Ltd, Fuji (JP); NISSAN MOTOR CO., LTD., Yokohama (JP)

(72) Inventors: Ryuzaburo Kobayashi, Isehara (JP); Kunihiko Fukanoki, Atsugi (JP); Akira Kamiyama, Sagamihara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/264,817

(22) PCT Filed: Feb. 25, 2022

(86) PCT No.: PCT/JP2022/008044
§ 371 (c)(1),
(2) Date: Aug. 9, 2023

(87) PCT Pub. No.: WO2022/196305
PCT Pub. Date: Sep. 22, 2022

(65) Prior Publication Data
US 2024/0102544 A1 Mar. 28, 2024

(30) Foreign Application Priority Data
Mar. 19, 2021 (JP) ................ 2021-046564

(51) Int. Cl.
F16H 48/40 (2012.01)
F16H 48/08 (2006.01)
F16H 57/04 (2010.01)

(52) U.S. Cl.
CPC ............ *F16H 48/40* (2013.01); *F16H 48/08* (2013.01); *F16H 57/0424* (2013.01)

(58) Field of Classification Search
CPC ....... F16H 48/40; F16H 57/0424; F16H 48/08
See application file for complete search history.

(56) References Cited

U.S. PATENT DOCUMENTS 10,107,375 B2 * 10/2018 Hornung ............... F16H 48/40
10,596,901 B2 * 3/2020 Yoshisaka ............ F16D 27/09
2009/0017962 A1 1/2009 Isken, II et al.

FOREIGN PATENT DOCUMENTS

JP 2009-019769 A 1/2009
WO WO-2004/076891 A1 9/2004

* cited by examiner

Primary Examiner — Huan Le
(74) Attorney, Agent, or Firm — Foley & Lardner LLP

(57) ABSTRACT

A power transmission device having: a case formed by assembling a first case member and a second case member; and a shaft member supported by the case, the power transmission device comprising: a protrusion provided to the first case member and protruding in the axial direction along to the direction of assembling the case; and a recess provided to the second case member and recessed in the axial direction. The shaft member is supported by the protrusion in the recess.

10 Claims, 18 Drawing Sheets

TRANSMISSION DEVICE

TECHNICAL FIELD

The present invention relates to a power transmission device.

BACKGROUND ART

Patent Documents 1 discloses a power transmission device with a bevel gear differential mechanism. The differential mechanism includes a pinion mate gear and a pinion mate shaft housed in a differential case.

PRIOR ART DOCUMENT

Patent Document

Patent Document 1: WO 2004/076891 A1

SUMMARY OF INVENTION

It is desirable to improve the freedom of assembly for the power transmission device.

A power transmission device according to one aspect of the present invention includes;
a case formed by assembling a first case member and a second case member, and
a shaft member supported in the case; wherein
the first case member has a protrusion protruding in the axial direction along the assembly direction of the case,
the second case member has a recess being recessed in the axial direction, and
the shaft member is supported by the protrusion in the recess.

According to one aspect of the present invention, the freedom of assembly can be improved.

DESCRIPTION OF EMBODIMENTS

Figure 1:
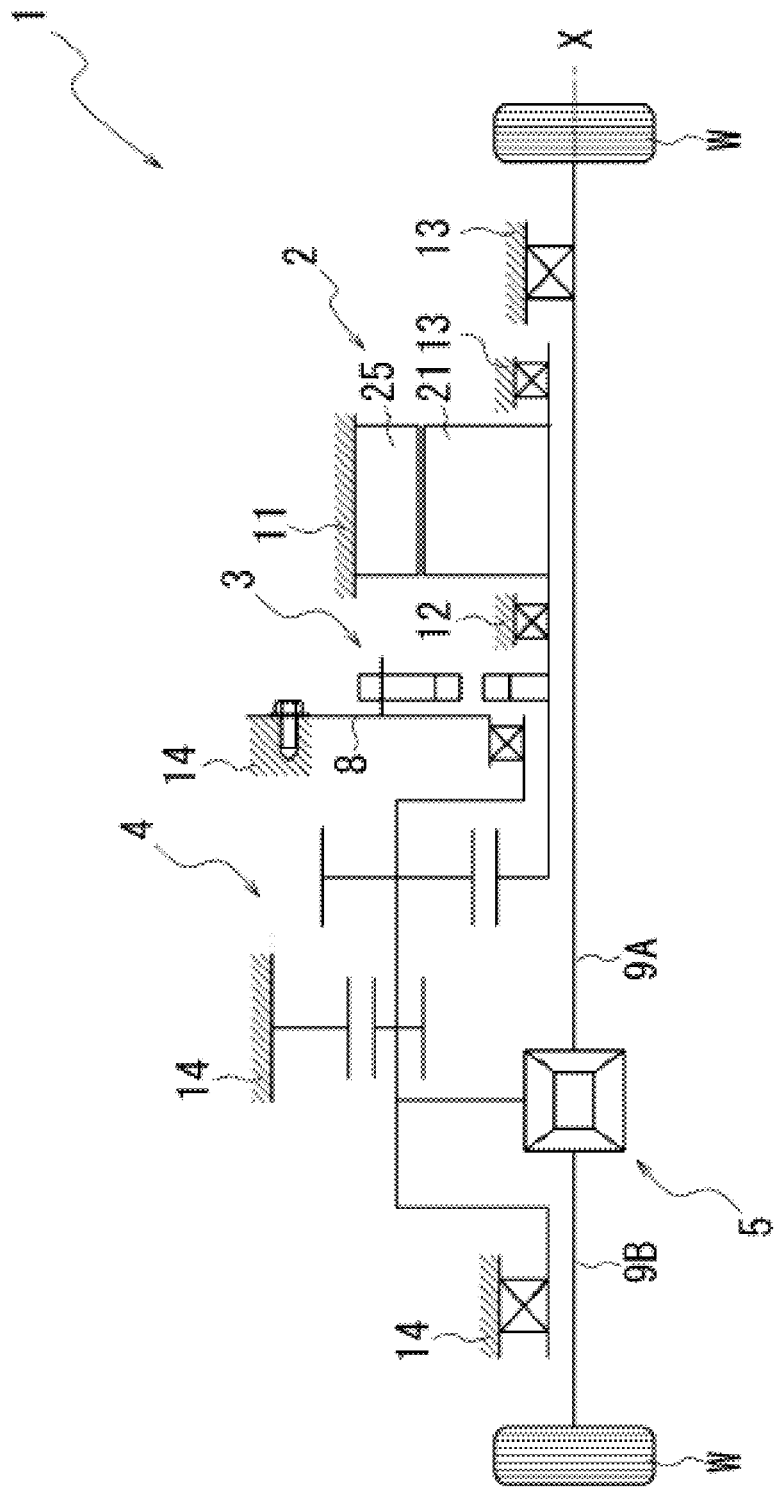
FIG. 1 is a skeleton parts diagram illustrating a power transmission device.

First, definitions of terms used in this specification will be described. A power transmission device is a device that has at least a power transmission mechanism. The power transmission device can be, for example, a gear mechanism and/or a differential gear mechanism.

When a second element (component, part, etc.) connected to a first element (component, part, etc.), a second element (component, part, etc.) connected downstream of the first element (component, part, etc.), or a second element (component, part, etc.) connected upstream of the first element (component, part, etc.) is mentioned, it means that the first and second elements are connected for power transmission. The input side of power is upstream, and the output side of power is downstream. The first and second elements may be connected via other elements (clutch, other gear mechanism, etc.).

"Overlap in a predetermined direction of view" means that multiple elements are arranged in a predetermined direction, and "overlap in a predetermined direction" is equivalent to this description. "Predetermined direction" can be, for example, axial direction, radial direction, gravity direction, vehicle travel direction (forward direction or backward direction of the vehicle), and the like.

If multiple elements (components, parts, etc.) are shown arranged in a predetermined direction on the drawings, it may be assumed that there is a description in the specification explaining that they overlap in a predetermined direction of view.

"Not overlapping in a predetermined direction of view" or "offset in a predetermined direction of view" means that multiple elements are not arranged in a predetermined direction, and "not overlapping in a predetermined direction" or "offset in a predetermined direction" is equivalent to this description. "Predetermined direction" can be, for example, axial direction, radial direction, gravity direction, vehicle travel direction (forward direction or backward direction of the vehicle), and the like.

If multiple elements (components, parts, etc.) are shown not arranged in a predetermined direction on the drawings, it may be assumed that there is a description in the specification explaining that they do not overlap in a predetermined direction of view.

The phrase "in a predetermined direction of view, the first element (component, part, etc.) is positioned between the second element (component, part, etc.) and the third element (component, part, etc.)" means that when observed from the predetermined direction, the first element can be observed to be located between the second and third elements. The "predetermined direction" refers to the axial direction, radial direction, gravity direction, vehicle travel direction (forward or backward), etc.

For example, if the second element, first element, and third element are arranged in that order along the axial direction, the first element can be said to be positioned between the second and third elements when viewed radially. If it is shown in the drawings that the first element is located between the second and third elements in a predetermined direction of view, it can be assumed that the description in the specification explains that the first element is positioned between the second and third elements in the predetermined direction of view.

When two elements (parts, components, etc.) overlap in the axial direction, the two elements are coaxial.

"Axial direction" refers to the axial direction of the rotating axis of the components that make up the power transmission device. "Radial direction" refers to the direction perpendicular to the rotating axis of the components that make up the power transmission device. Examples of components include motors, gear mechanisms, differential gear mechanisms, etc.

The rotation elements (such as sun gear, carrier, ring gear) of the planetary gear mechanism are "fixed" to other elements, which means that they can be directly fixed or fixed via another member.

The following describes embodiments of the present invention.

FIG. 1 is a skeleton parts diagram illustrating a power transmission device 1.

Figure 2:
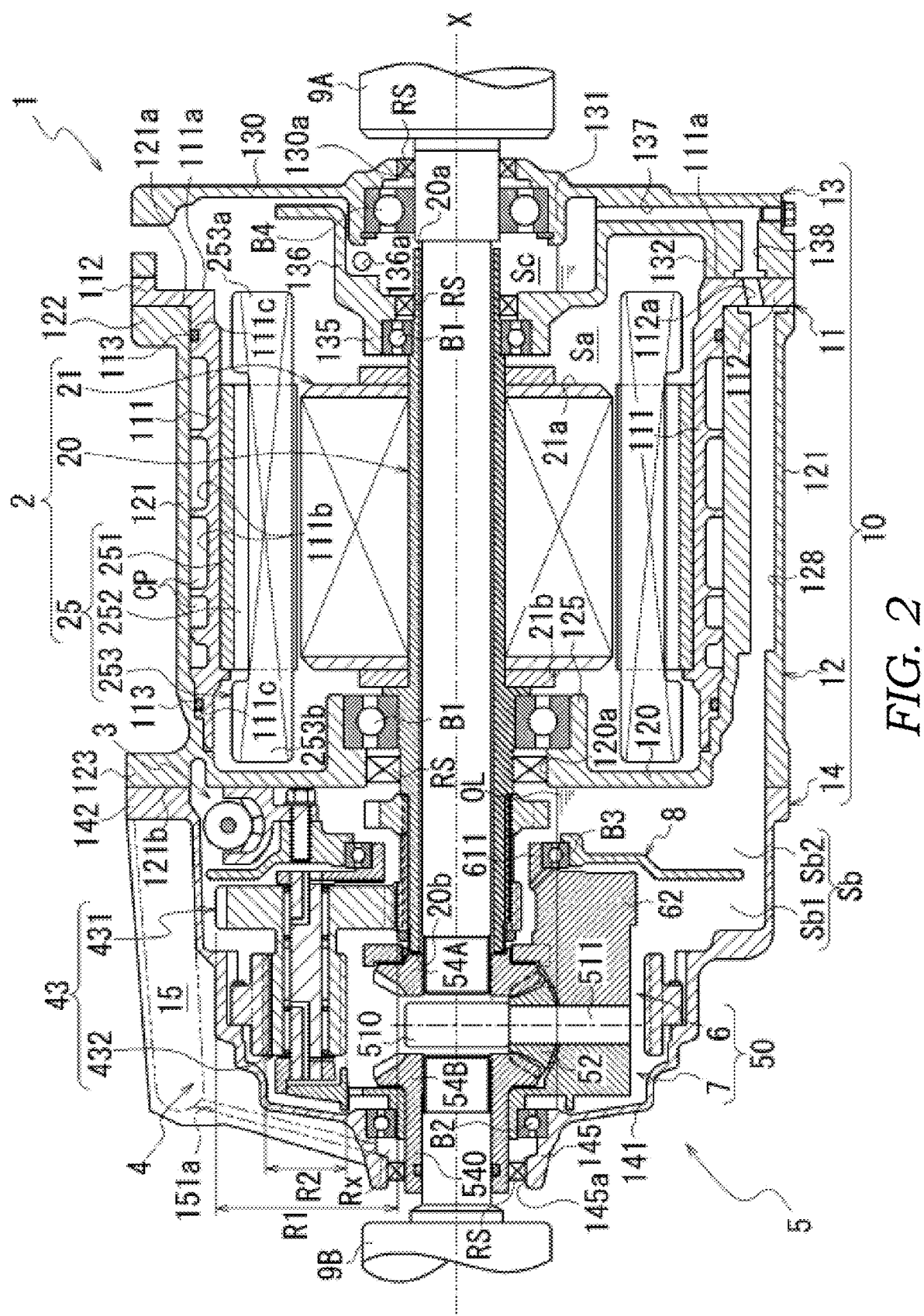
FIG. 2 is a schematic cross-sectional view illustrating the power transmission device.

FIG. 2 is a schematic sectional view illustrating the power transmission device 1.

Figure 3:
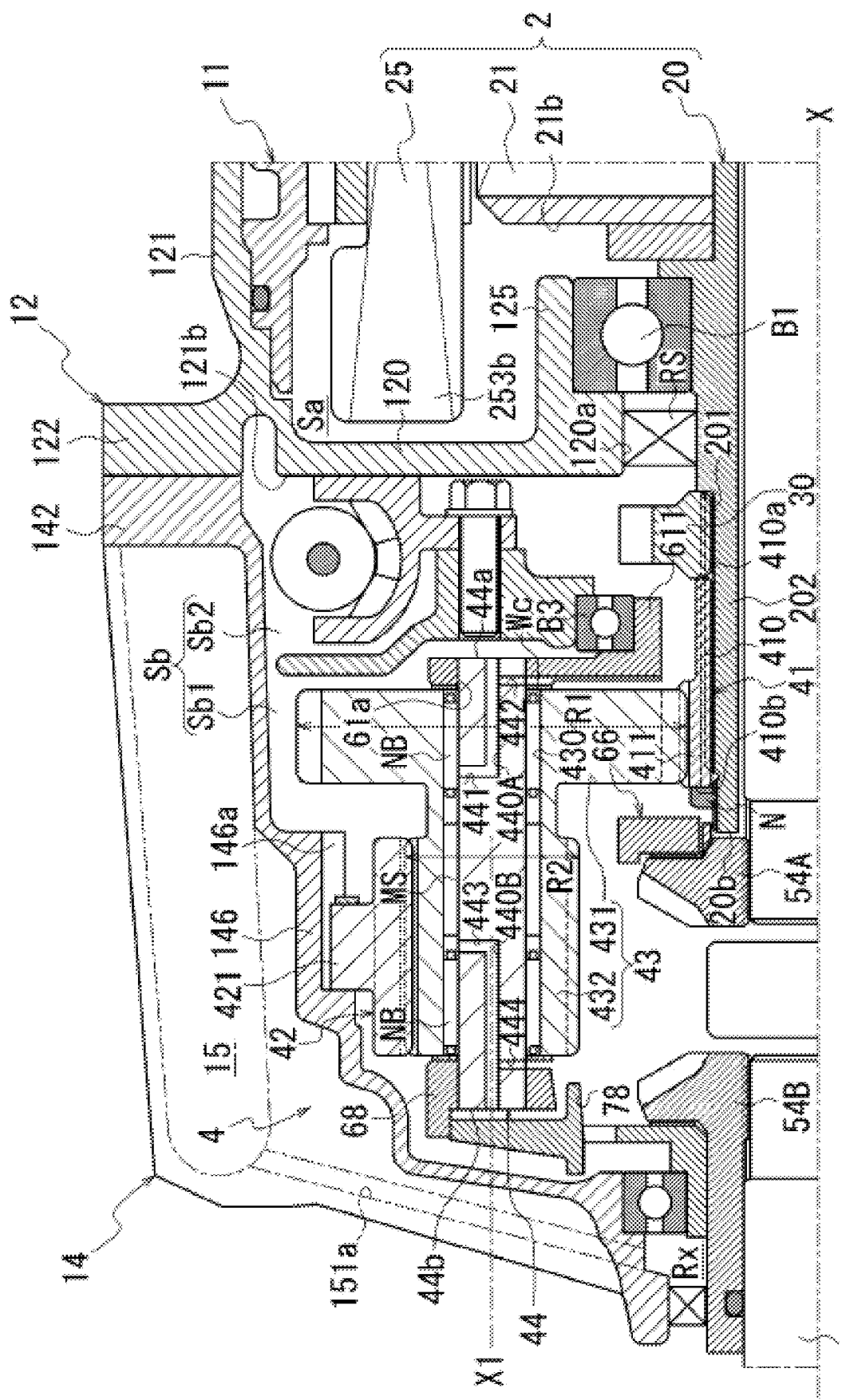
FIG. 3 is an enlarged view around the planetary reduction gear of the power transmission device.

FIG. 3 is an enlarged view around the planetary reduction gear 4 of the power transmission device 1.

Figure 4:
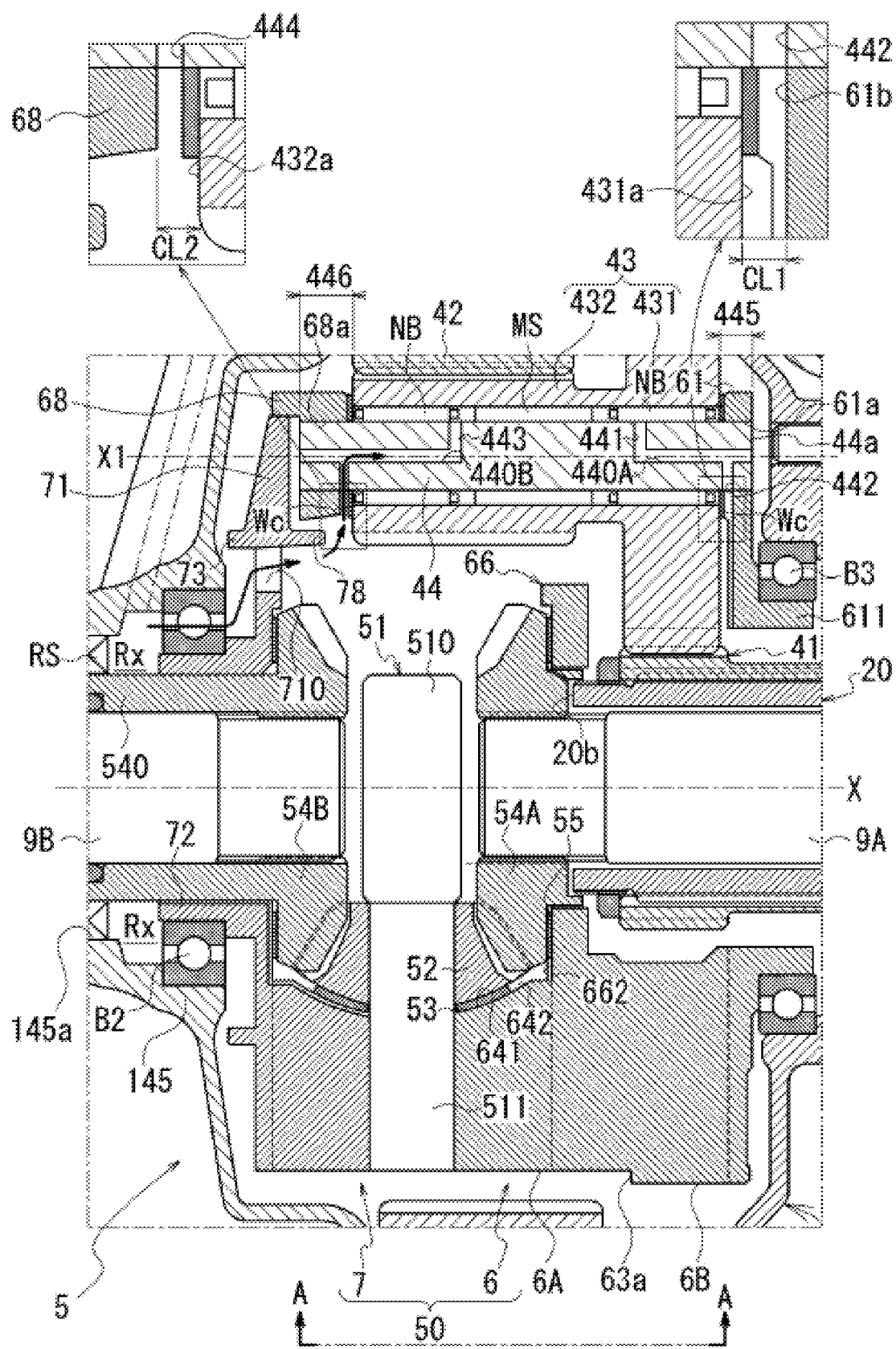
FIG. 4 is an enlarged view around the differential mechanism of the power transmission device.

FIG. 4 is an enlarged view around the differential mechanism 5 of the power transmission device 1.

As shown in FIG. 1, the power transmission device 1 has a motor 2, a planetary reduction gear 4 (reduction mechanism), and a differential mechanism 5. The power transmission device 1 also has drive shafts 9A and 9B and a park lock mechanism 3.

Along the transmission path of the output rotation of the motor 2 around its rotation axis X, the park lock mechanism 3, the planetary reduction gear 4, the differential mechanism 5, and the drive shafts 9A and 9B are provided. The planetary reduction gear 4 is connected downstream of the motor 2. The differential mechanism 5 is connected downstream of the planetary reduction gear 4. The drive shafts 9A and 9B are connected downstream of the differential mechanism 5. The drive shafts 9A and 9B are respectively connected to one side and the other side of the rotation axis X of the differential mechanism 5. The axis lines of the drive shafts 9A and 9B are coaxial with the rotation axis X of the motor 2. Each of the drive shafts 9A and 9B are connected to left and right drive wheels W of the vehicle.

Motor 2 is a rotary electric machine having at least one of an electric motor function and a power generation function. In the power transmission device 1, the output rotation of the motor 2 is reduced by the planetary reduction gear 4 and input to the differential mechanism 5. The differential mechanism 5 transmits rotation to the drive wheels W through the drive shafts 9A and 9B.

As shown in FIG. 2, the main box 10 of the power transmission device 1 has a first box 11 that houses the motor 2 and a second box 12 that is extrapolated from the first box 11. The main box 10 also has a third box 13 that is assembled to the first box 11 and a fourth box 14 that is assembled to the second box 12.

The first box 11 has a cylindrical support wall portion 111 and a flange-like joint portion 112 provided at one end 111a of the support wall portion 111.

The first box 11 is provided in a direction in which the support wall portion 111 is aligned with the rotation axis X of the motor 2. The motor 2 is accommodated inside the support wall portion 111.

The joint portion 112 is provided in a direction perpendicular to the rotation axis X. The joint portion 112 is formed with a larger outer diameter than the support wall portion 111.

The second box 12 has a cylindrical circumferential wall portion 121, a flange-like joint portion 122 provided at one end 121a of the circumferential wall portion 121, and a flange-like joint portion 123 provided at the other end 121b of the circumferential wall portion 121.

The circumferential wall portion 121 is formed with an inner diameter that can be fitted over the support wall portion 111 of the first box 11.

The first box 11 and the second box 12 are assembled by fitting the circumferential wall portion 121 of the second box 12 over the support wall portion 111 of the first box 11.

The joint portion 122 on the end 121a side of the circumferential wall portion 121 is in contact with the joint portion 112 of the first box 11 in the direction of the rotation axis X. These joint portions 122 and 112 are connected to each other by bolts (not shown).

In the first box 11, a plurality of grooves 111b are provided on the outer periphery of the support wall portion 111. The plurality of grooves 111b are provided at intervals in the direction of the rotation axis X. Each of the grooves 111b is provided over the entire circumference in the circumferential direction around the rotation axis X.

The circumferential wall portion 121 of the second box 12 is inserted into the support wall portion 111 of the first box 11. The openings of the grooves 111b are closed by the circumferential wall portion 121. A plurality of cooling passages CP through which cooling water flows are formed between the support wall portion 111 and the circumferential wall portion 121.

On the outer circumference of the support wall portion 111 of the first box 11, ring grooves 111c and 111c are formed on both sides of the area where the grooves 111b are provided. The seal rings 113 and 113 are fitted and attached to the ring grooves 111c and 111c, respectively.

These seal rings 113 press-fit into the inner circumference of the circumferential wall portion 121 extrapolated to the support wall portion 111, and seal the gap between the outer circumference of the support wall portion 111 and the inner circumference of the circumferential wall portion 121.

The other end 121b of the second box 12 has a wall portion 120 extending on the inner diameter side. The wall portion 120 is provided in a direction perpendicular to the rotation axis X. An opening 120a through which the drive shaft 9A is inserted is provided in an area where the wall portion 120 intersects the rotation axis X.

On the side (right side in the figure) of the motor 2 in the wall portion 120, a cylindrical motor supporting portion 125 surrounding the opening 120a is provided.

The motor supporting portion 125 is inserted inside the coil end 253b to be described later. The motor supporting portion 125 faces the end portion 21b of the rotor core 21 with a gap in the X-axis direction.

The circumferential wall portion 121 of the second box 12 has a thicker radial thickness in a lower region in the vertical direction based on the mounting state of the power transmission device 1 on a vehicle than in an upper region.

In this region with a thicker radial thickness, an oil pooling portion 128 penetrating in the axial direction of the rotation axis X is provided.

The oil pooling portion 128 communicates with an axial oil passage 138 provided in the joint portion 132 of the third box 13 through a communication hole 112a. The communication hole 112a is provided in the joint portion 112 of the first box 11.

The third box 13 has a wall portion 130 orthogonal to the rotation axis X. A joint portion 132 forming a ring shape when viewed from the direction of the rotation axis X is provided on the outer peripheral portion of the wall portion 130.

The third box 13 is located on the opposite side (right side in the figure) from the differential mechanism 5 when viewed from the first box 11. The joint portion 132 of the third box 13 is joined to the joint portion 112 of the first box 11 from the direction of the rotation axis X. The third box 13 and the first box 11 are connected to each other by bolts (not shown). In this state, the opening of the first box 11 on the joint portion 122 side (right side in the figure) of the support wall portion 111 is blocked by the third box 13.

In the third box 13, a through-hole 130a of the drive shaft 9A is provided at the center of the wall portion 130.

A lip seal RS is provided on the inner circumference of the through-hole 130a. The lip seal RS elastically contacts an unillustrated lip portion with the outer circumference of the drive shaft 9A. The gap between the inner circumference of the through-hole 130a and the outer circumference of the drive shaft 9A is sealed by the lip seal RS.

On the side of the first box 11 (left side in the figure) of the wall portion 130, a circumferential wall portion 131 surrounding the through-hole 130a is provided. The drive shaft 9A is supported by bearing B4 through the inner circumference of the circumferential wall portion 131.

A motor supporting portion 135 is provided on the motor 2 side (left side in the figure) from the circumferential wall portion 131. The motor supporting portion 135 forms a cylindrical shape surrounding the rotation axis X at a distance.

On the outer periphery of the motor supporting portion 135, a cylindrical connecting wall 136 is connected. The connecting wall 136 is formed with a larger outer diameter than the circumferential wall portion 131 on the wall portion 130 side (right side in the figure). The connecting wall 136 is provided in the direction along the rotation axis X and extends away from the motor 2. The connecting wall 136 connects the motor supporting portion 135 and the wall portion 130 of the third box 13.

The motor supporting portion 135 is supported by the third box 13 via a connecting wall 136. The inside of the motor supporting portion 135 is penetrated by one end 20a of the motor shaft 20 from the motor 2 side to the circumferential wall portion 131 side.

A bearing B1 is supported on the inner circumference of the motor supporting portion 135. The outer circumference of the motor shaft 20 is supported by the motor supporting portion 135 via the bearing B1.

A lip seal RS is provided in a position adjacent to the bearing B1.

Oil holes 136a to be described later are opened on the inner circumference of the connecting wall 136 in the third box 13. The oil OL flows into the internal space Sc surrounded by the connecting wall 136 through the oil hole 136a. The lip seal RS is provided to prevent the oil OL inside the connecting wall 136 from flowing into the motor 2 side.

The fourth box 14 has a circumferential wall portion 141 that surrounds the outer periphery of the planetary reduction gear 4 and the differential mechanism 5, and a flange-like joint portion 142 provided at the end on the side of the second box 12 in the circumferential wall portion 141. The fourth box 14 functions as a box that accommodates the planetary reduction gear 4 and the differential mechanism 5.

The fourth box 14 is located on the differential mechanism 5 side (left side in the drawing) when viewed from the second box 12. The joint portion 142 of the fourth box 14 is joined to the joint portion 123 of the second box 12 from the direction of the rotation axis X. The fourth box 14 and the second box 12 are connected to each other by bolts (not shown).

The inside of the main box 10 of the power transmission device 1 has a motor chamber Sa for accommodating the motor 2, and a gear compartment Sb for accommodating the planetary reduction gear 4 and the differential mechanism 5.

The motor chamber Sa is formed inside the first box 11, between the wall portion 120 of the second box 12 and the wall portion 130 of the third box 13.

The gear chamber Sb is formed on the inner diameter side of the fourth box 14, between the wall portion 120 of the second box 12 and the circumferential wall portion 141 of the fourth box 14.

A plate member 8 is provided inside the gear compartment Sb.

The plate member 8 is fixed to the fourth box 14.

The plate member 8 divides the gear compartment Sb into a first gear compartment Sb1 for accommodating the planetary reduction mechanism 4 and the differential mechanism 5, and a second gear chamber Sb2 for accommodating the park lock mechanism 3.

In the direction of the rotation axis X, the second gear compartment Sb2 is located between the first gear compartment Sb1 and the motor compartment Sa.

The motor 2 has a motor shaft 20, a rotor core 21, and a stator core 25. The motor shaft 20 and rotor core 21 are cylindrical. The rotor core 21 is extrapolated onto the motor shaft 20. The stator core 25 surrounds the outer circumference of the rotor core 21 at a distance.

On the motor shaft 20, bearings B1 and B1 are extrapolated and fixed on both sides of the rotor core 21.

The bearing B1 located on one end 20a side of the motor shaft 20 from the rotor core 21 (right side in the figure) is supported by the inner circumference of the motor supporting portion 135 of the third box 13. The other bearing B1 located on the other end 20b side is supported by the inner circumference of the cylindrical motor supporting portion 125 of the second box 12.

The motor supporting portions 135 and 125 are arranged along the inner diameter of the coil ends 253a and 253b described later. The motor supporting portions 135 and 125 are arranged facing each other with a gap in the X-axis direction of the rotation shaft between one end portion 21a and the other end portion 21b of the rotor core 21.

The rotor core 21 is formed by stacking multiple silicon steel plates. Each silicon steel plate is extrapolated onto the motor shaft 20 in a state where relative rotation with the motor shaft 20 is regulated.

From the X-axis direction of rotation of the motor shaft 20, the silicon steel plates form a ring shape. North and south pole magnets (not shown) are alternately provided in the circumferential direction around the rotation axis X on the outer circumference side of the silicon steel plates.

The stator core 25 surrounding the outer circumference of the rotor core 21 is formed by laminating multiple electromagnetic steel plates. The stator core 25 is fixed to the inner circumference of the cylindrical support wall portion 111 of the first box 11.

Each of the electromagnetic steel plates has a yoke portion 251, a teeth portion 252, and a coil 253. The yoke portion 251 is ring-shaped and is fixed to the inner circumference of the support wall portion 111. The teeth portion 252 protrudes from the inner circumference of the yoke portion 251 towards the rotor core 21.

For example, coil 253 is formed by winding a winding (not shown) across multiple teeth portions 252. Known copper wire or the like can be used for the winding that forms the coil 253. The coil 253 may be configured as a distributed winding wound around each of the multiple teeth portions 252 protruding towards the rotor core 21, or as a concentrated winding.

In the stator core 25, the length of the coil 253 in the direction of the rotation axis X is set to be longer than that of the rotor core 21. The stator core 25 has coil ends 253a and 253b located at both ends of the coil 253 in the direction of the rotation axis X, which protrude further in the direction of the rotation axis X than the rotor core 21. The coil ends 253a and 253b have a symmetrical shape across the teeth portion 252.

An opening 120a is provided in the wall portion 120 (motor supporting portion 125) of the second box 12. The other end 20b of the motor shaft 20 penetrates the opening 120a towards the differential mechanism 5 side (left side in the figure) and is located inside the fourth box 14.

The other end 20b of the motor shaft 20 faces the side gear 54A with a gap in the direction of the rotation axis X inside the fourth box 14, as will be described later.

As shown in FIG. 3, the motor shaft 20 has a step portion 201 in the region located inside the fourth box 14. The step portion 201 is located near the motor supporting portion 125. A lip seal RS supported by the inner circumference of the motor supporting portion 125 contacts the outer circumference of the area between the step portion 201 and the bearing B1.

The lip seal RS divides the motor chamber Sa that accommodates the motor 2 and the gear chamber Sb inside the fourth box 14.

Oil OL for lubricating the planetary reduction gear 4 and the differential mechanism 5 is sealed inside the fourth box 14 on the inner diameter side (see FIG. 2).

The lip seal RS is provided to prevent the flow of oil OL into the motor chamber Sa.

As shown in FIG. 3, the region of the motor shaft 20 from the step portion 201 to the vicinity of the other end 20b is a fitting portion 202 with splines provided on the outer circumference.

The park gear 30 and the sun gear 41 are spline-fitted on the outer circumference of the fitting portion 202.

One side surface of the park gear 30 is in contact with the step portion 201 in the direction of the rotation axis X (on the right side in the figure). One end 410a of the cylindrical base 410 of the sun gear 41 contacts the other side surface of the park gear 30 in the direction of the rotation axis X (on the left side in the figure).

A nut N is press-fitted from the direction of the rotation axis X on the other end 410b of the base 410. The nut N is screwed onto the other end 20b of the motor shaft 20.

The sun gear 41 and the park gear 30 are provided to be unable to rotate relative to the motor shaft 20, being sandwiched between the nut N and the step portion 201.

The sun gear 41 has teeth portion 411 on the outer circumference of the other end 20b side of motor shaft 20. A stepped pinion gear 43 with a large diameter gear portion 431 as a pinion gear is engaged with the teeth portion 411 on the outer circumference.

Stepped pinion gear 43 has a large diameter gear portion 431 that engages with the sun gear 41, and a small diameter gear portion 432 that is smaller than the large diameter gear portion 431.

The stepped pinion gear 43 is a gear component in which the large diameter gear portion 431 and the small diameter gear portion 432 are provided integrally and arranged parallel to the rotation axis X1 direction.

The large diameter gear portion 431 is formed with a larger outer diameter R1 than the outer diameter R2 of the small diameter gear portion 432.

The stepped pinion gear 43 is provided in the direction along the axis X1, and the large diameter gear portion 431 is located on the motor 2 side (right side in the figure) of the small diameter gear portion 432.

The outer circumference of the small diameter gear portion 432 is engaged with the inner circumference of the ring gear 42. The ring gear 42 forms a ring shape that surrounds the rotation axis X at a distance. A plurality of engaging teeth 421 protruding radially outward are provided on the outer circumference of the ring gear 42. The plurality of engaging teeth 421 are provided at intervals in the circumferential direction around the rotation axis X.

The engaging teeth 421 are provided on the outer circumference of the ring gear 42. Teeth portion 146a is provided on the support wall portion 146 of the fourth box 14. The engaging teeth 421 are spline-fitted to the teeth portion 146a. The rotation of the ring gear 42 around the rotation axis X is restricted.

The stepped pinion gear 43 has a through hole 430. The through hole 430 penetrates the inner diameter side of the large diameter gear portion 431 and the small diameter gear portion 432 in the axial direction X1. The pinion shaft 44 is inserted into the through hole 430. Needle bearings NB and NB are provided on the outer circumference of the pinion shaft 44. The stepped pinion gear 43 is rotatably supported via the needle bearings NB and NB.

One needle bearing NB on one side (right side in the figure) in the direction of the rotation axis X supports the inner circumference of the large diameter gear portion 431. The other needle bearing NB on the other side (left side in the figure) in the direction of the rotation axis X supports the inner circumference of the small diameter gear portion 432. An intermediate spacer MS is interposed between the needle bearings NB and NB.

As shown in FIG. 4, the inside of the pinion shaft 44 has internal oil passages 440A and 440B. The axial internal oil passage 440A extends from one end 44a (right side in the figure) of the pinion shaft 44 to the inner diameter side of the large diameter gear portion 431 along the axis X1. The axial internal oil passage 440B extends from the other end 44b (left side in the figure) of the pinion shaft 44 to the inner diameter side of the small diameter gear portion 432 along the axis X1.

The pinion shaft 44 has oil holes 441, 442, 443, and 444. The oil holes 441 and 442 communicate the axial internal oil passage 440A with the outer circumference of the pinion shaft 44. The oil holes 443 and 444 communicate the axial internal oil passage 440B with the outer circumference of the pinion shaft 44.

Oil hole 441 opens in the region where the needle bearing NB is provided, and the needle bearing NB supports the inner circumference of the large diameter gear portion 431. In the pinion shaft 44, the oil hole 441 opens in the region where the stepped pinion gear 43 is extrapolated. Oil hole 442 opens in the gap CL1 in the axial direction of the large diameter gear portion 431 and the opposing surface 61b of the case member 6 of the differential case 50.

Oil OL scraped up by the differential case 50 described later flows into the oil hole 442. The oil OL that flows into the oil hole 442 flows into the axial internal oil passage 440A of the pinion shaft 44. The oil OL that flows into the axial internal oil passage 440A is discharged radially outward from the oil hole 441. The oil OL discharged from the oil hole 441 lubricates the needle bearing NB extrapolated on the pinion shaft 44.

Furthermore, the oil hole 443 opens into the region where the needle bearing NB supporting the inner circumference of the small diameter gear portion 432 is provided. In the pinion shaft 44, the oil hole 443 opens into the region where the stepped pinion gear 43 is extrapolated.

The oil hole 444 communicates the axial internal oil passage 440B with the outer circumference of the pinion shaft 44. The oil hole 444 opens into the gap CL2 between the side wall 432a of the small diameter gear portion 432 in the X1 axis direction and the plate portion 68 of the case member 6 described later.

Oil OL scraped up by the differential case 50 described later flows into the gap CL2 and flows toward the outer diameter side. The oil OL that flows from the gap CL2 into the oil hole 444 flows into the axial internal oil passage 440B of the pinion shaft 44. The oil OL that flows into the axial internal oil passage 440B is discharged radially outward from the oil hole 443. The oil OL discharged from the oil hole 443 lubricates the needle bearing NB extrapolated on the pinion shaft 44. In other words, the gap CL2 functions as an oil path that leads the oil OL scraped up by the differential case 50 to the pinion shaft 44.

As shown in FIG. 4, the pinion shaft 44 has a first shaft portion 445 on one end 44a side (right side in FIG. 4) in the longitudinal direction. The first shaft portion 445 is a region that protrudes from the stepped pinion gear 43. The first shaft portion 445 is supported by a support hole 61a provided in the case member 6 of the differential case 50.

The pinion shaft 44 has a second shaft portion 446 on the other end 44b side (left side in FIG. 4) in the longitudinal direction. The second shaft portion 446 is also a region that protrudes from the stepped pinion gear 43. The second shaft portion 446 is supported by a support hole 68a provided in the case member 6 of the differential case 50. As will be described in detail later, the second shaft portion 446 is press-fitted into the support hole 68a. The second shaft portion 446 is supported so as to be unable to rotate relative to the case member 6.

Here, the first shaft portion 445 is a region on the end 44a side of the pinion shaft 44 where the stepped pinion gear 43 is not extrapolated. The second shaft portion 446 is a region on the other end 44b side of the pinion shaft 44 where the stepped pinion gear 43 is not extrapolated.

In the pinion shaft 44, the length in the axial direction X1 of the second shaft portion 446 is longer than that of the first shaft portion 445.

The main structure of the differential mechanism 5 will be described below.

Figure 5:
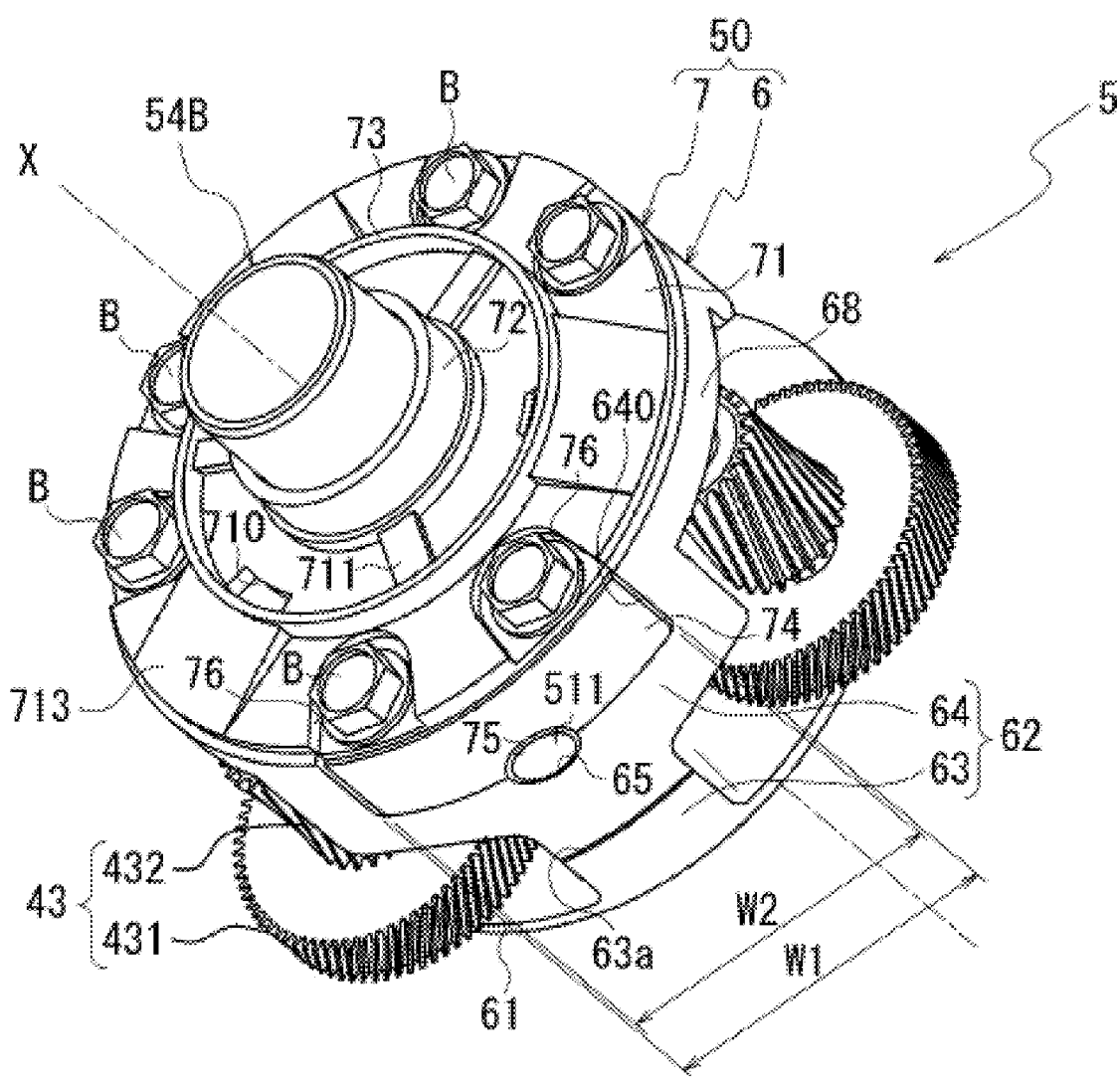
FIG. 5 is a perspective view of the differential case of the differential mechanism.

FIG. 5 is a perspective view around the differential case 50 of the differential mechanism 5.

Figure 6:
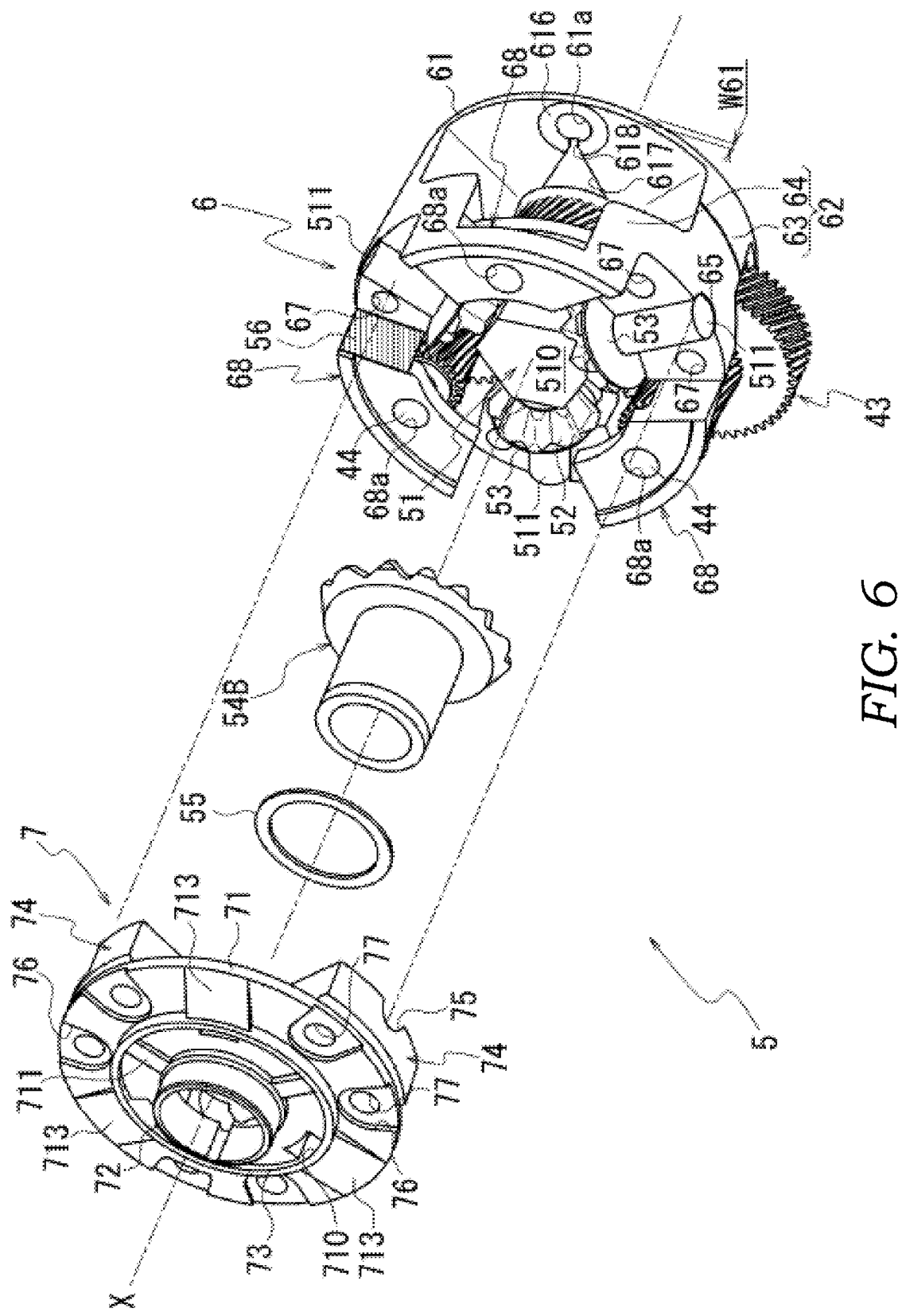
FIG. 6 is an exploded perspective view of the differential case of the differential mechanism.

FIG. 6 is an exploded perspective view around the differential case 50 of the differential mechanism 5, exposing the inside of the differential mechanism 5 by omitting one stepped pinion gear 43.

As shown in FIGS. 4 to 6, the differential case 50 as a case accommodates the differential mechanism 5. The differential case 50 is formed by assembling the case member 6 (second case member) and the case member 7 (first case member) in the direction of the rotation axis X. The case member 6 of the differential case 50 functions as a carrier supporting the pinion shaft 44 of the planetary reduction gear 4.

As shown in FIG. 6, three pinion mate gears 52 and pinion mate shaft 51 are provided between the case members 6 and 7 of the differential case 50. The pinion mate shaft 51 functions as a support shaft for supporting the pinion mate gears 52.

The pinion mate shaft 51 has three shaft members 511 provided at equal intervals in the circumferential direction around the rotation axis X (see FIG. 6).

The inner end of each shaft member 511 is connected to a central member 510 arranged on the rotation axis X. That is, the shaft members 511 are arranged radially with respect to the central member 510. The pinion mate shaft 51 may be formed integrally with the central member 510 and the shaft members 511.

Each of the pinion mate gears 52 is extrapolated on each shaft member 511. Each of the pinion mate gears 52 is in contact with the central member 510 from the radially outer side of the rotation axis X. In this state, each of the pinion mate gears 52 is rotatably supported by the shaft members 511.

As shown in FIG. 4, spherical washers 53 are extrapolated on the shaft members 511. The spherical washers 53 are in contact with the spherical outer periphery of the pinion mate gears 52.

In the differential case 50, the side gear 54A is located on one side of the central member 510 in the direction of the rotation axis X, and the side gear 54B is located on the other side. The side gear 54A is rotatably supported by the case member 6, and the side gear 54B is rotatably supported by the case member 7.

The side gear 54A engages with three pinion mate gears 52 from one side in the direction of the rotation axis X. The side gear 54B engages with three pinion mate gears 52 from the other side in the direction of the rotation axis X.

FIGS. 7 to 12 are diagrams explaining the case member 6.

Figure 7:
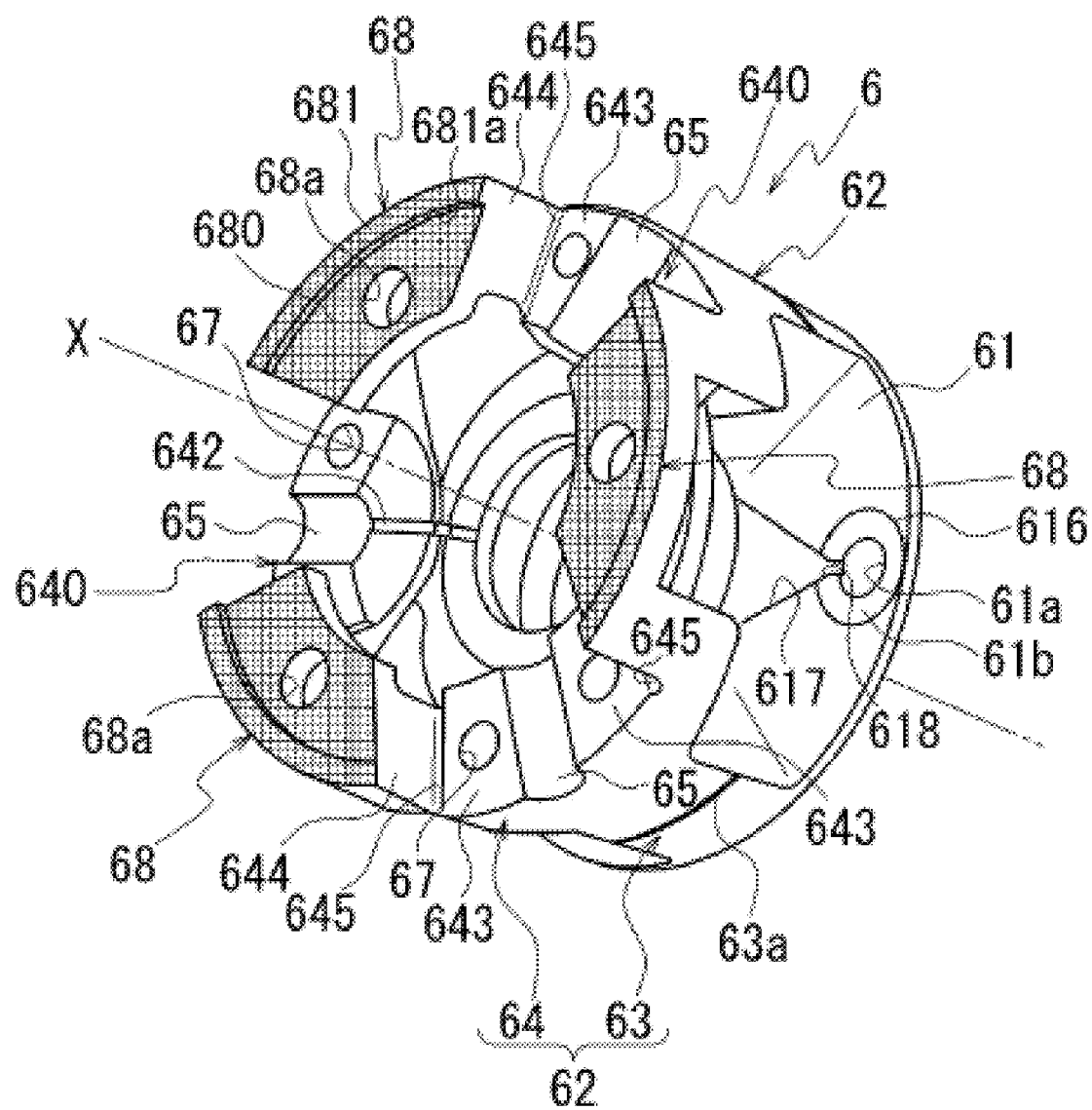
FIG. 7 is a perspective view of the case member 6 of the differential mechanism viewed from the case member 7 side.

FIG. 7 is a perspective view of the case member 6 of the differential mechanism 5 as viewed from the side of the case member 7.

Figure 8:
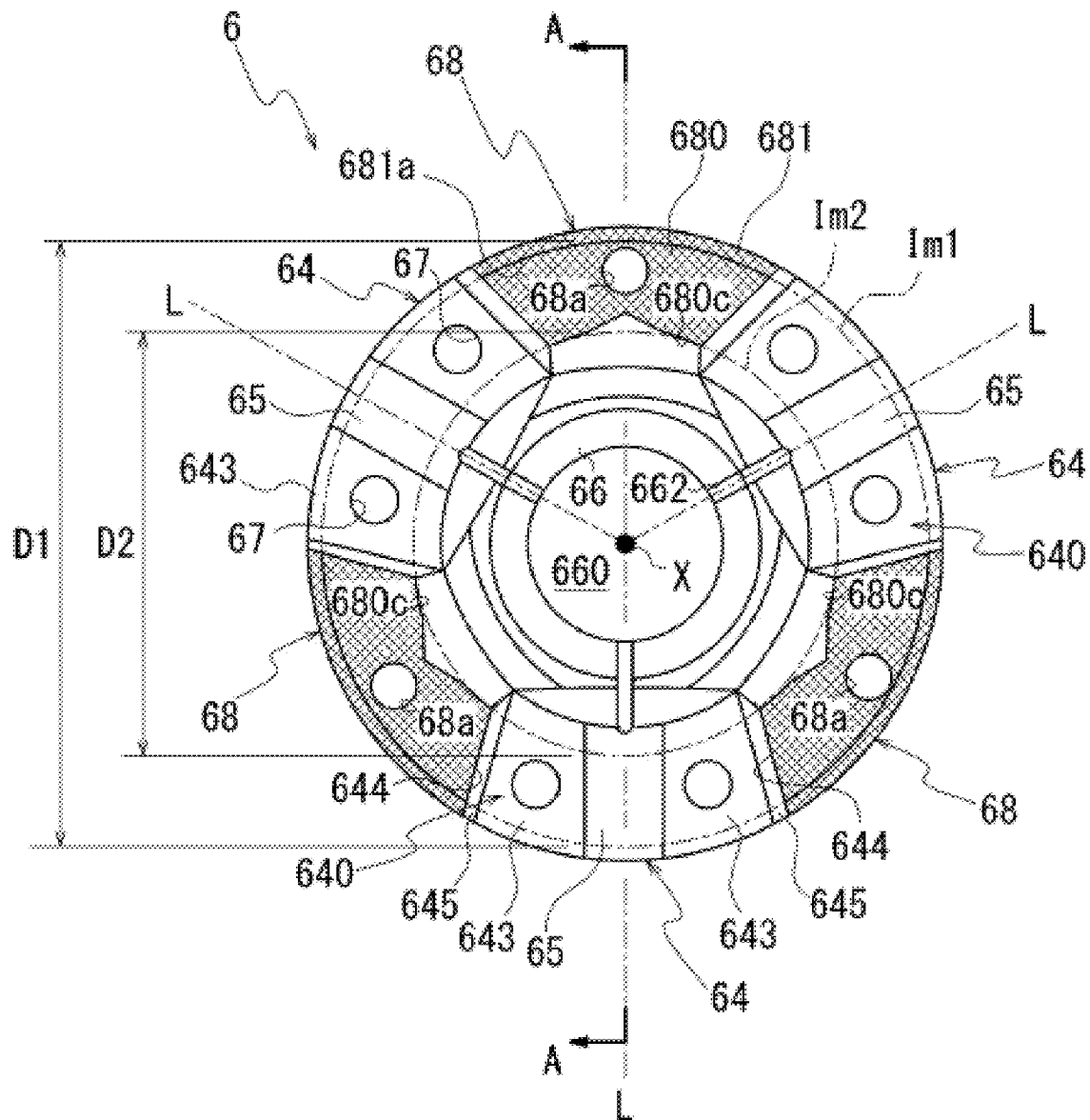
FIG. 8 is a plan view of the case member 6 of the differential mechanism viewed from the case member 7 side.

FIG. 8 is a plan view of the case member 6 of the differential mechanism 5 as viewed from the side of the case member 7.

In FIGS. 7 and 8, cross-hatching is added to the plate portion 68 for easier viewing.

Figure 9:
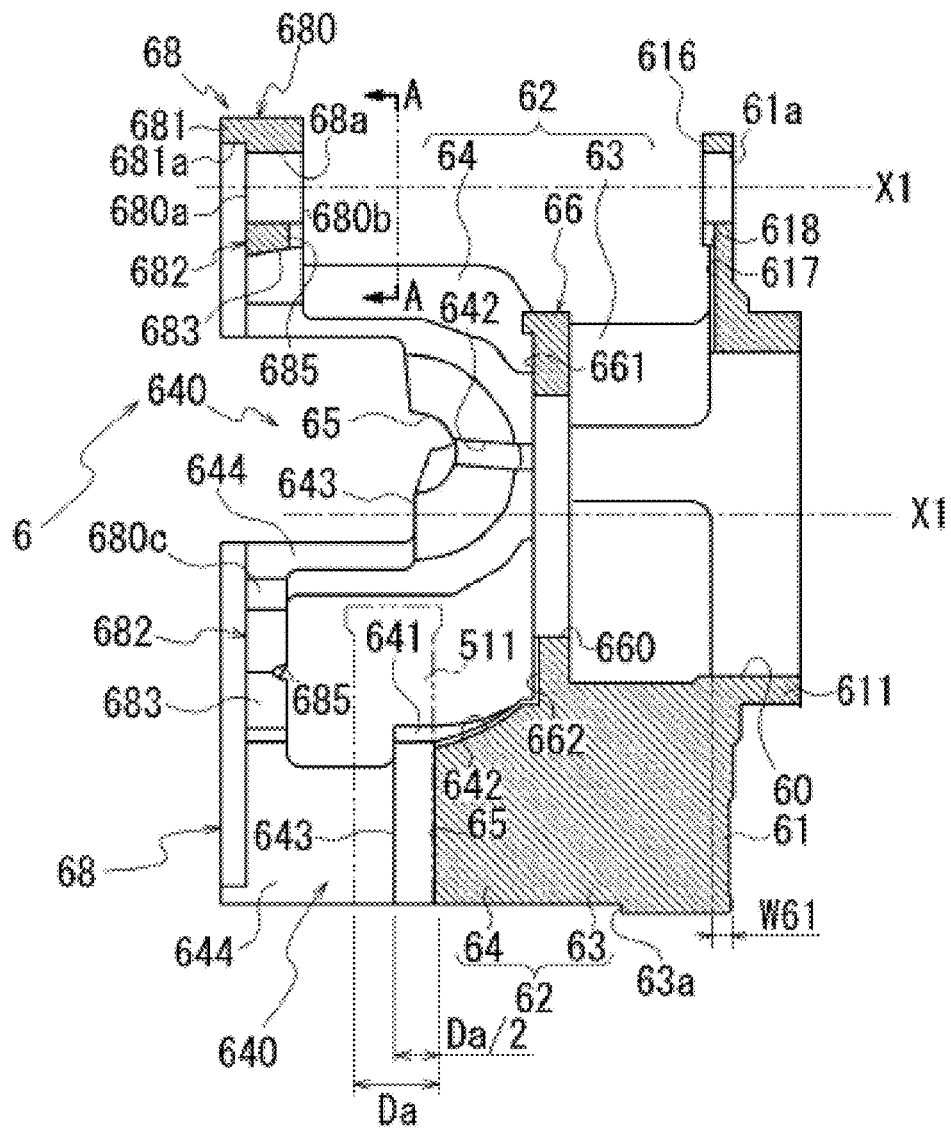
FIG. 9 is a schematic view of the A-A section in FIG. 8.

FIG. 9 is a schematic view of the A-A cross-section in FIG. 8, showing the arrangement of the shaft member 511 of the pinion mate shaft 51 in dotted lines.

Figure 10:
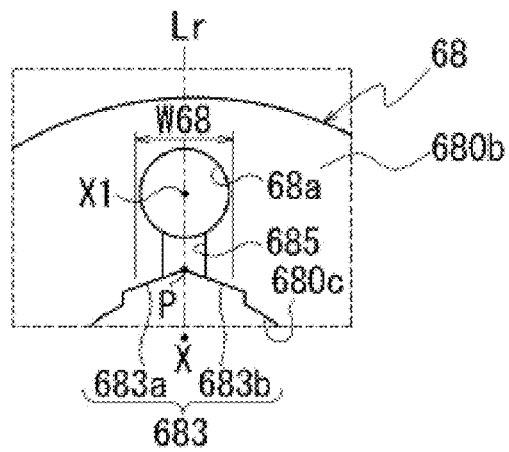
FIG. 10 is an arrow view of the A-A section in FIG. 9.

FIG. 10 is an arrow diagram of the A-A direction in FIG. 9.

Figure 11:
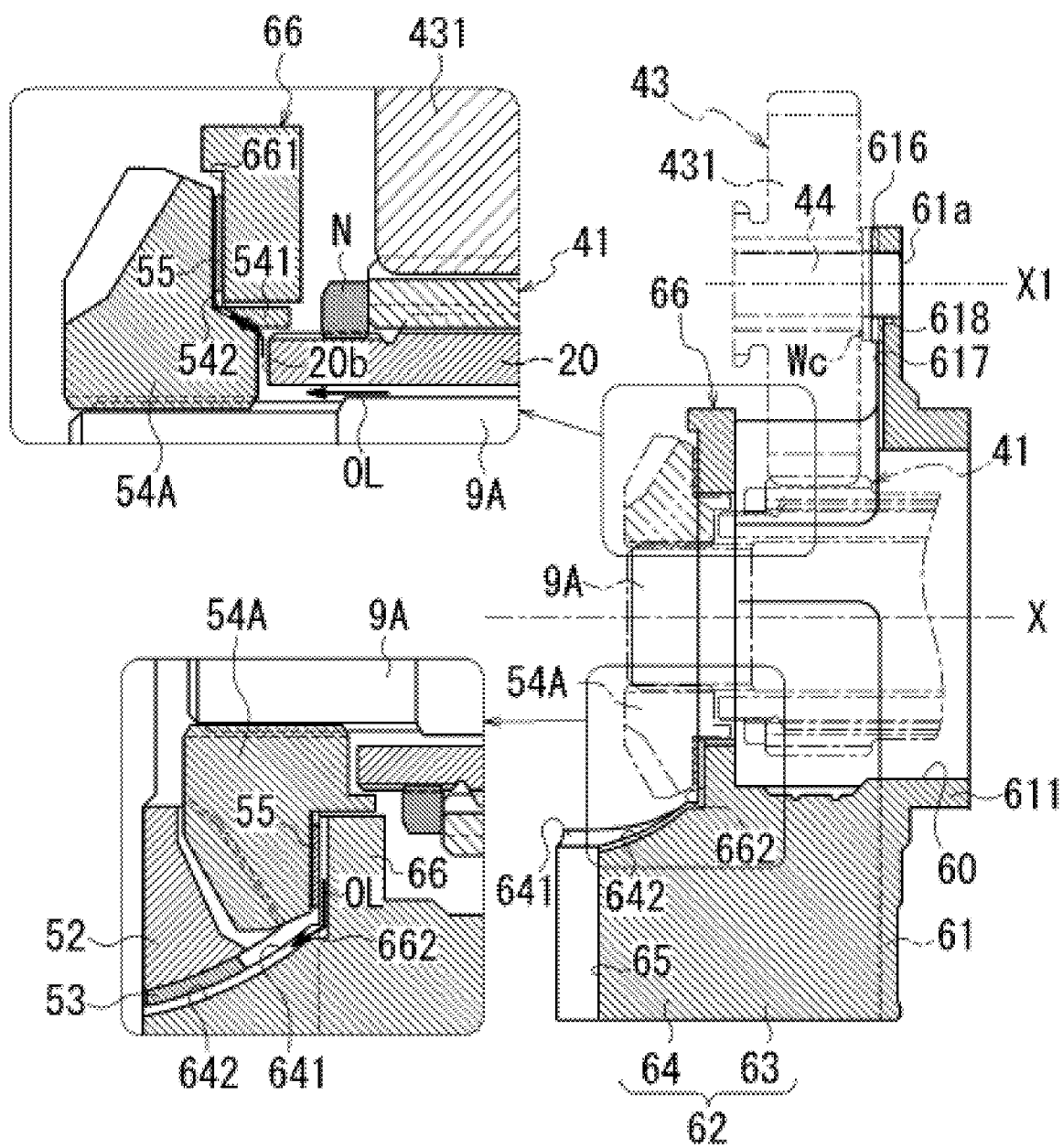
FIG. 11 is a schematic view of the A-A section in FIG. 8.

FIG. 11 is a schematic view of the A-A cross-section in FIG. 8, omitting the plate member 68 and the connecting beam 62 on the back side of the paper. FIG. 11 shows the side gear 54A, stepped pinion gear 43, and drive shaft 9A in dotted lines.

Figure 12:
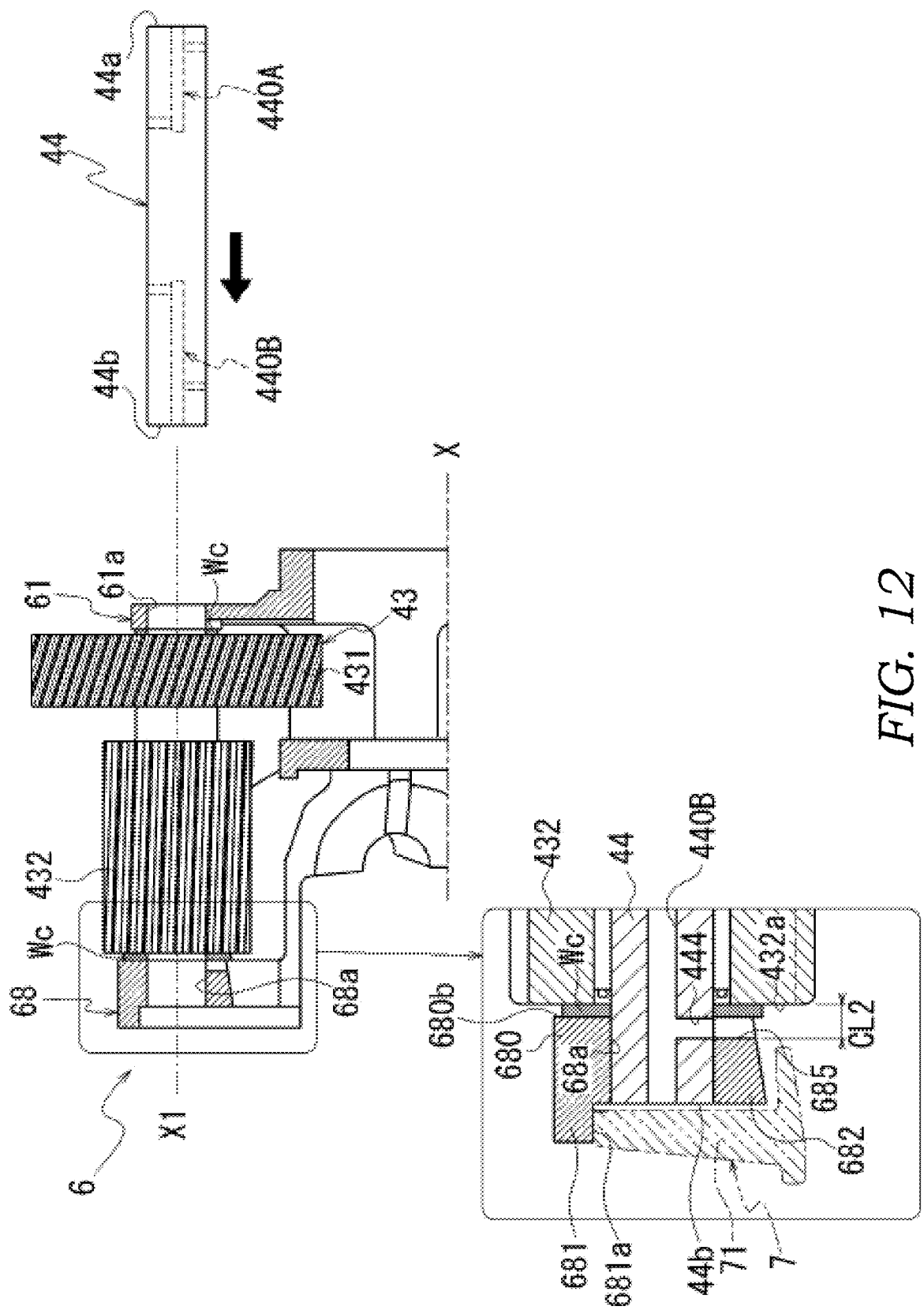
FIG. 12 shows the upper region of the rotation axis X in FIG. 9 and the stepped pinion gear in solid lines.

FIG. 12 shows the upper region of the rotation axis X in FIG. 9. The stepped pinion gear 43 is shown in solid lines.

As shown in FIGS. 7 and 9, the case member 6 has a ring-shaped base 61. The base 61 is a plate member having a thickness W61 in the direction of the rotation axis X.

As shown in FIG. 9, an opening 60 is provided in the center of the base 61. A cylindrical tubular wall portion 611 surrounding the opening 60 is provided on the base 61. The cylindrical tubular wall portion 611 is provided on the side opposite (right side in FIG. 9) to the case member 7 of the base 61. The outer circumference of the cylindrical tubular wall portion 611 is supported by a plate member 8 via a bearing B3 (see FIG. 2).

The base 61 is provided with three connecting beams 62 that extend toward the case member 7 side. The connecting beams 62 are provided on the surface of the base 61 on the case member 7 side (the left side in FIG. 9).

The three connecting beams 62 are provided at equal intervals in the circumferential direction around the rotation axis X (see FIGS. 7 and 8).

As shown in FIG. 7, the connecting beams 62 have a base 63 that is connected to the base 61. The base 63 extends in a direction orthogonal to the base 61. The connecting beams 62 have a connecting portion 64 that is connected to the case member 7 side of the base 63 (the left side in the figure). The connecting portion 64 is wider than the base 63. The connecting portion 64 has a greater width in the circumferential direction around the rotation axis X than the base 63.

On the inner diameter side of the connecting portion 64, a circular space is formed when viewed from the direction of the rotation axis X. As shown in FIG. 6, the central member 510 of the pinion mate shaft 51, the pinion mate gear 52, and the spherical washer 53 are accommodated in this space. The spherical washer 53 is positioned on the outer circumference of the pinion mate gear 52, and the central member 510 is positioned on the inner circumference of the pinion mate gear 52.

Connecting member 64 is provided at equal intervals in the circumferential direction around the rotation axis X, as shown in FIG. 8. Three plate portions 68 are arranged between the connecting portions 64. The plate portions 68 extend along the circumferential direction around the rotation axis X and connect the adjacent connecting portions 64. The plate portions 68 have an arc shape as viewed from the direction of the rotation axis X. As shown in FIG. 9, the plate portions 68 protrude toward the case member 7 side (left side in the figure) more than the connecting portions 64. The plate portions 68 face the base 61 with a gap. The stepped pinion gear 43 and pinion shaft 44 are accommodated in this gap (see FIG. 5).

As shown in FIG. 7, a step portion 63a is formed along the circumferential direction around the rotation axis X on the outer peripheral surface of the base 63. As shown in FIG. 4, the case member 6 is divided into a first portion 6A on the case member 7 side (left side in the figure) and a second portion 6B on the base 61 side (right side in the figure) separated by the step portion 63a.

The diameter of the outer peripheral surface of the second portion 6B is larger than that of the outer peripheral surface of the first portion 6A. The weight of the case member 6 is reduced by making the thickness of the first portion 6A in the radial direction of the rotation axis X smaller than the thickness of the second portion 6B. The step portion 63a shown in FIG. 7 is formed near the center of the rotation axis X of the base 63 in the X direction. The position where the step portion 63a is formed can be changed appropriately.

As shown in FIG. 8, a recess 640 is provided at the center of the direction of the rotation axis X in the circumferential direction of the connecting portion 64. As shown in FIG. 7, the recess 640 is concave toward the base 61 side with respect to the plate portion 68. The recess 640 has a bottom surface portion 643 and a side wall portion 644. The arc-shaped bottom surface portion 643 extends along the circumferential direction of the rotation axis X of the recess 640. The side wall portion 644 extends in the X direction toward the plate portion 68 from the bottom surface portion 643.

A groove portion 645 extending in the radial direction of the rotation axis X is formed at the boundary between the bottom surface portion 643 and the side wall portion 644. The bottom surface portion 643 of the recess 640 is a surface extending in a direction perpendicular to the rotation axis X. A support groove 65 (second cutout portion) for supporting the shaft member 511 of the pinion mate shaft 51 is provided on the bottom surface portion 643.

As shown in FIG. 8, the support groove 65, when viewed from the direction of the rotation axis X, is formed linearly along the radius line L of the ring-shaped base 61. The support groove 65 transverses the central portion of the recess 640 in the circumferential direction of the rotation axis X from the inner diameter side to the outer diameter side.

As shown in FIG. 9, the support groove 65 has a semi-circular shape. The support groove 65 is formed by cutting out the bottom surface portion 643 along the outer diameter of the shaft member 511 of the pinion mate shaft 51. The support groove 65 is formed to a depth capable of accommodating half of the cylindrical shaft member 511. That is, the support groove 65 is formed to a depth corresponding to half the diameter Da (=Da/2) of the shaft member 511.

An arc portion 641 is formed on the inner diameter side (rotation axis X side) of the connecting portion 64, along the outer circumference of the pinion mate gear 52.

In the arc portion 641, the outer circumference of the pinion mate gear 52 is supported by a spherical washer 53.

In the arc portion 641, an oil groove 642 is provided in the direction along the above-mentioned radius line L. The oil groove 642 is provided in the range from the support groove 65 that supports the shaft member 511 to the gear support portion 66 fixed to the inner circumference of the connecting portion 64.

The gear support portion 66 is connected to the boundary between the base 63 and the connecting portion 64. The gear support portion 66 is provided in a direction perpendicular to the rotation axis X and has a through hole 660 in the central portion.

As shown in FIG. 8, the outer circumference of the gear support portion 66 is connected to the inner circumference of three connecting portions 64. In this state, the center of the through hole 660 is located on the rotation axis X.

As shown in FIGS. 9 and 11, in the gear support portion 66, a recess 661 is provided on the side opposite to the base 61 (left side in the figure). The recess 661 surrounds the through hole 660. A ring-shaped washer 55 is accommodated in the recess 661. The washer 55 supports the back surface of the side gear 54A.

The back surface of the side gear 54A has a cylindrical tubular wall portion 541, and the washer 55 is extrapolated on the tubular wall portion 541.

From the X-axis direction of the rotation axis, three oil grooves 662 are provided on the side of the recess 661 in the gear support portion 66. The oil grooves 662 are provided at predetermined intervals in the circumferential direction around the X-axis.

The oil grooves 662 extend from the inner circumference to the outer circumference of the gear support portion 66 along the radius line L mentioned above. The oil grooves 662 are in communication with the oil groove 642 on the arc portion 641 side mentioned above.

As shown in FIGS. 7 and 9, the support hole 61a for the pinion shaft 44 is opened in the base 61. The support hole 61a opens into the region between the connecting beams 62, 62 arranged at intervals in the circumferential direction around the X-axis.

The boss portion 616 surrounding the support hole 61a is provided in the base 61. The washer We (see FIG. 11) extrapolated from the pinion shaft 44 is in contact with the boss portion 616 from the X-axis direction of rotation.

In the base 61, an oil groove 617 is provided in the range from the central opening 60 to the boss portion 616.

As shown in FIG. 7, the oil groove 617 is formed in a tapered shape with a gradually narrowing width in the circumferential direction around the X-axis as it approaches the boss portion 616. The oil groove 617 is in communication with the oil groove 618 provided in the boss portion 616.

In the connecting portion 64, bolt holes 67, 67 are provided on both sides of the support groove 65.

As shown in FIG. 6, the connecting portion 74 on the case member 7 side is joined to the connecting portion 64 on the case member 6 from the X-axis direction of rotation. The case members 6 and 7 are joined to each other by bolts B (see FIG. 5). The bolt B penetrates through the connecting portion 74 on the case member 7 side and is screwed into the bolt hole 67.

As shown in FIG. 8, the plate portion 68 is composed of an arc-shaped base 680 and an outer circumferential wall portion 681 provided on the outer peripheral edge of the base 680 when viewed from the X-axis direction of rotation.

As shown in FIG. 9, the base 680 is a plate member arranged along the thickness direction in the X-axis direction of rotation. One end surface 680a and the other end surface 680b of the base 680 in the X-axis direction of rotation are flat surfaces perpendicular to the X-axis of rotation. The outer circumferential wall portion 681 protrudes from one end surface 680a of the base 680 in the X-axis direction of rotation.

As shown in FIG. 8, the outer circumferential wall portion 681 is formed over the entire length of the base 680 in the circumferential direction around the rotation axis X when viewed from the X-axis direction. The inner circumferential surface 681a of the outer circumferential wall portion 681 is formed to overlap with a virtual circle Im1 having a diameter D1. The inner circumferential surface 680c of the base 680 is formed to overlap with a virtual circle Im2 having a diameter D2.

As shown in FIG. 9, a support hole 68a penetrating the base 680 in the X-axis direction of rotation is formed in the plate portion 68. The support hole 68a and the support hole 61a are concentrically arranged along the axis X1 parallel to the rotation axis X.

As shown in FIG. 8, the support hole 68a is formed in the central portion of the base 680 in the circumferential direction around the rotation axis X.

Note that, as will be described later in detail, the region on the inner diameter side of the support hole 68a in the base 680 of the plate portion 68 forms an oil receiving portion 682 (see FIG. 9). The oil receiving portion 682 receives oil OL scraped up by the rotation of differential case 50.

In the following description, the end face 680a, the other end face 680b, and the inner circumferential surface 680c of the base 680 on the inner diameter side of the support hole 68a are also referred to as the end face 680a, the other end face 680b, and the inner circumferential surface 680c of the oil receiving portion 682.

As shown in FIG. 10, a recess 683 is provided on the inner circumferential surface 680c of the oil receiving portion 682. The recess 683 is formed by cutting out the central portion of the circumferential direction around the rotation axis X of the inner circumferential surface 680c.

When viewed from the direction of the rotation axis X, the recess 683 is open towards the radial inner diameter side. The recess 683 has inclined surfaces 683a and 683b. The inclined surfaces 683a and 683b have a decreasing circumferential opening width W68 towards the outer diameter side from the inner circumferential surface 680c. The inclined surface 683a and the inclined surface 683b of the recess 683 intersect at vertex P. The vertex P is located on a diameter line Lr passing through the rotation axis X and the axis line X1.

As shown in FIG. 9, the inner circumferential surface 680c and the recess 683 of the oil receiving portion 682 are inclined to be located on the radial outer side as they go from one end surface 680a to the other end surface 680b in the direction of the rotation axis X.

The inclined surfaces 683a and 683b of the recess 683 are also inclined to be located on the radial outer side as they go from one end surface 680a to the other end surface 680b in the direction of the rotation axis X.

As shown in FIG. 9, an oil groove 685 is formed on the other end face 680b of the oil receiving portion 682 in the direction of the rotation axis X. The oil groove 685 connects the recess 683 and the support hole 68a. The oil groove 685 extends linearly along the diameter line Lr from the vertex P of the recess 683 (see FIG. 10).

As shown in FIG. 12, the assembly of the stepped pinion gear 43 to the case member 6 is carried out by placing the stepped pinion gear 43 in the space between the base 61 and the plate portion 68 in the direction of the rotation axis X. The pinion shaft 44 is inserted from the support hole 61a side (arrow direction in the figure). A washer Wc is interposed between the large diameter gear portion 431 and the base 61 in the direction of the rotation axis X. A washer Wc is also interposed between the small diameter gear portion 432 and the base 680.

One end 44a and the other end 44b of the pinion shaft 44 are supported by support holes 61a and 68a, respectively. The diameter of the support hole 61a is set slightly larger than the outer diameter of the pinion shaft 44. The diameter of the support hole 68a is set to approximately match the outer diameter of the pinion shaft 44. At the other end 44b of the pinion shaft 44, it is press-fitted into the support hole 68a. As a result, the pinion shaft 44 is fixed to the case member 6 so as to be unable to rotate relative to it. The stepped pinion gear 43 is extrapolated onto the pinion shaft 44 and is supported so as to be rotatable around the axis X1 by the pinion shaft 44.

As shown in the enlarged area of FIG. 12, assemble the stepped pinion gear 43 to the case member 6. The other end face 680b of the base 680 faces the side wall 432a of the small diameter gear portion 432 via the washer Wc in the direction of the rotation axis X.

In the area of the base 680 where the oil groove 685 of the oil receiving portion 682 is formed, a gap CL2 is formed.

The gap CL2 is formed between the oil groove 685 in the direction of the rotation axis X and the side wall 432*a* of the small diameter gear portion 432, with the washer Wc sandwiched in between. The oil hole 444 of the pinion shaft 44 opens into the gap CL2.

As shown in the enlarged area of FIG. 12, the case member 7 (shown in a virtual line) is attached to the case member 6 from the plate portion 68 side in the direction of the rotation axis X.

FIGS. 13 to 20 are parts diagrams illustrating the case member 7.

Figure 13:
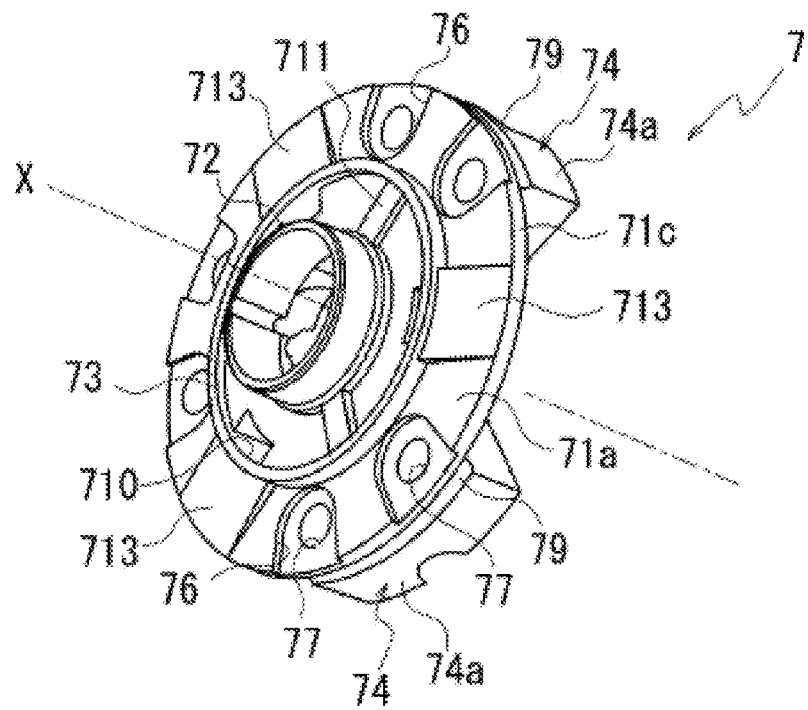
FIG. 13 is a perspective view of the case member 7 viewed from the opposite side of the case member 6.

FIG. 13 is a perspective view of the case member 7 viewed from the opposite side of the case member 6.

Figure 14:
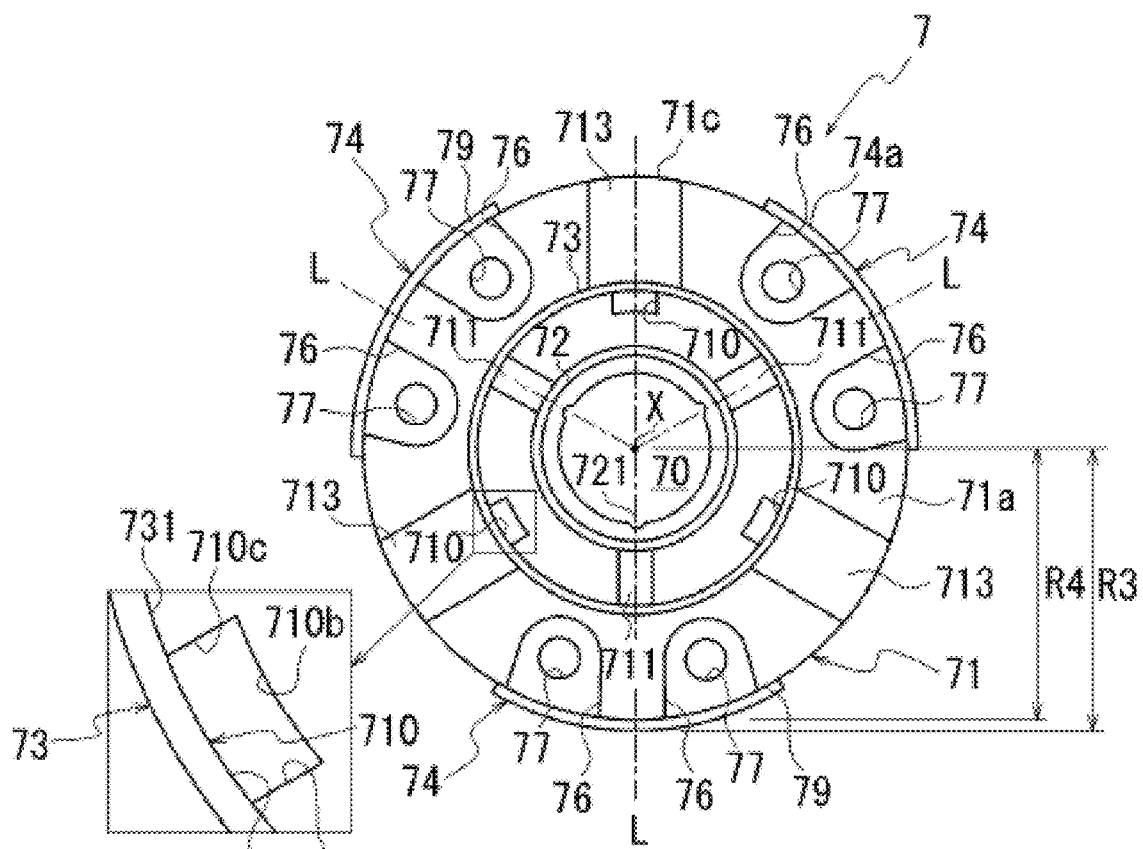
FIG. 14 is a plan view of the case member 7 viewed from the opposite side of the case member 6.

FIG. 14 is a plan view of the case member 7 viewed from the opposite side of the case member 6.

Figure 15:
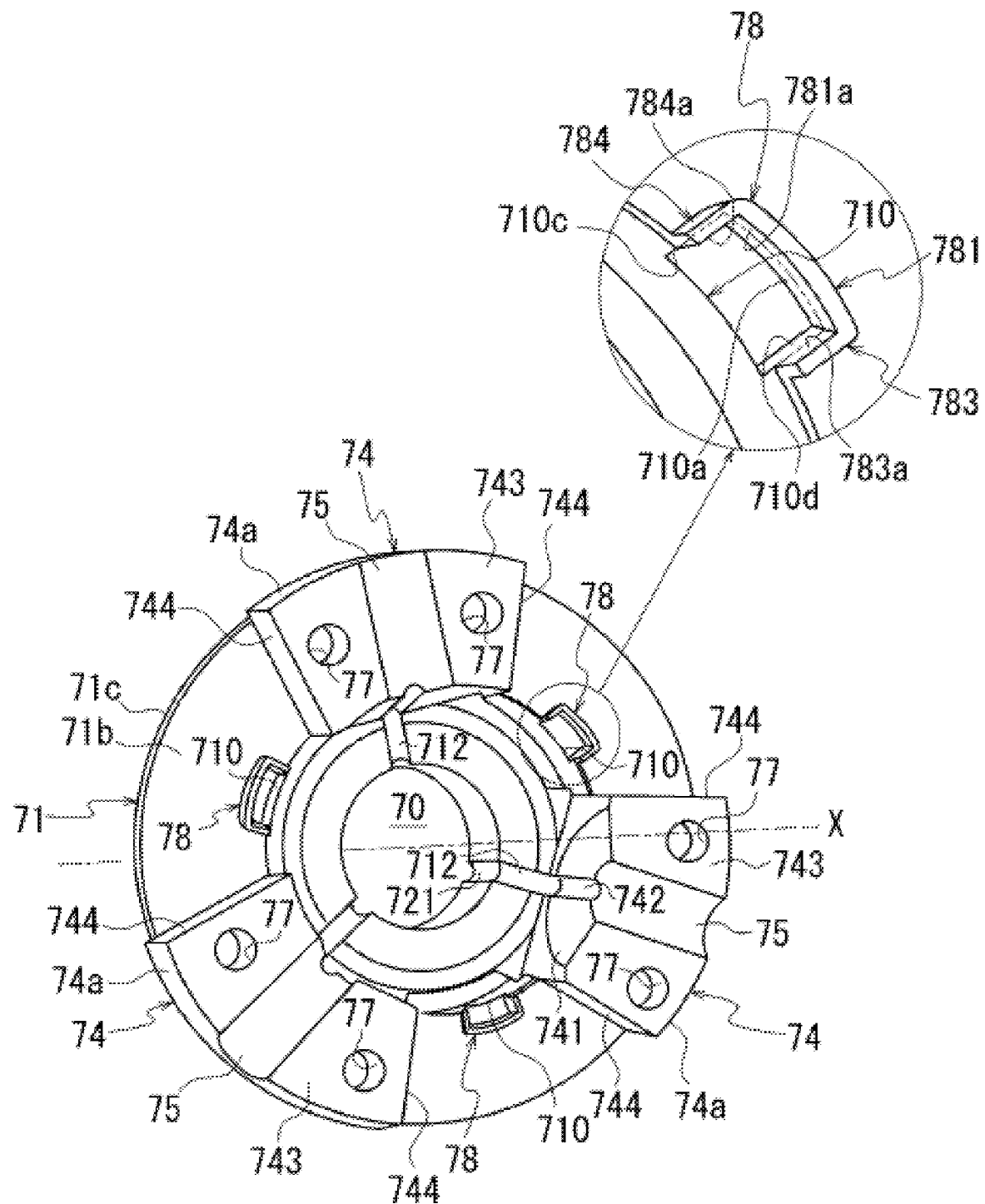
FIG. 15 is a perspective view of the case member 7 viewed from the case member 6 side.

FIG. 15 is a perspective view of the case member 7 viewed from the side of the case member 6.

Figure 16:
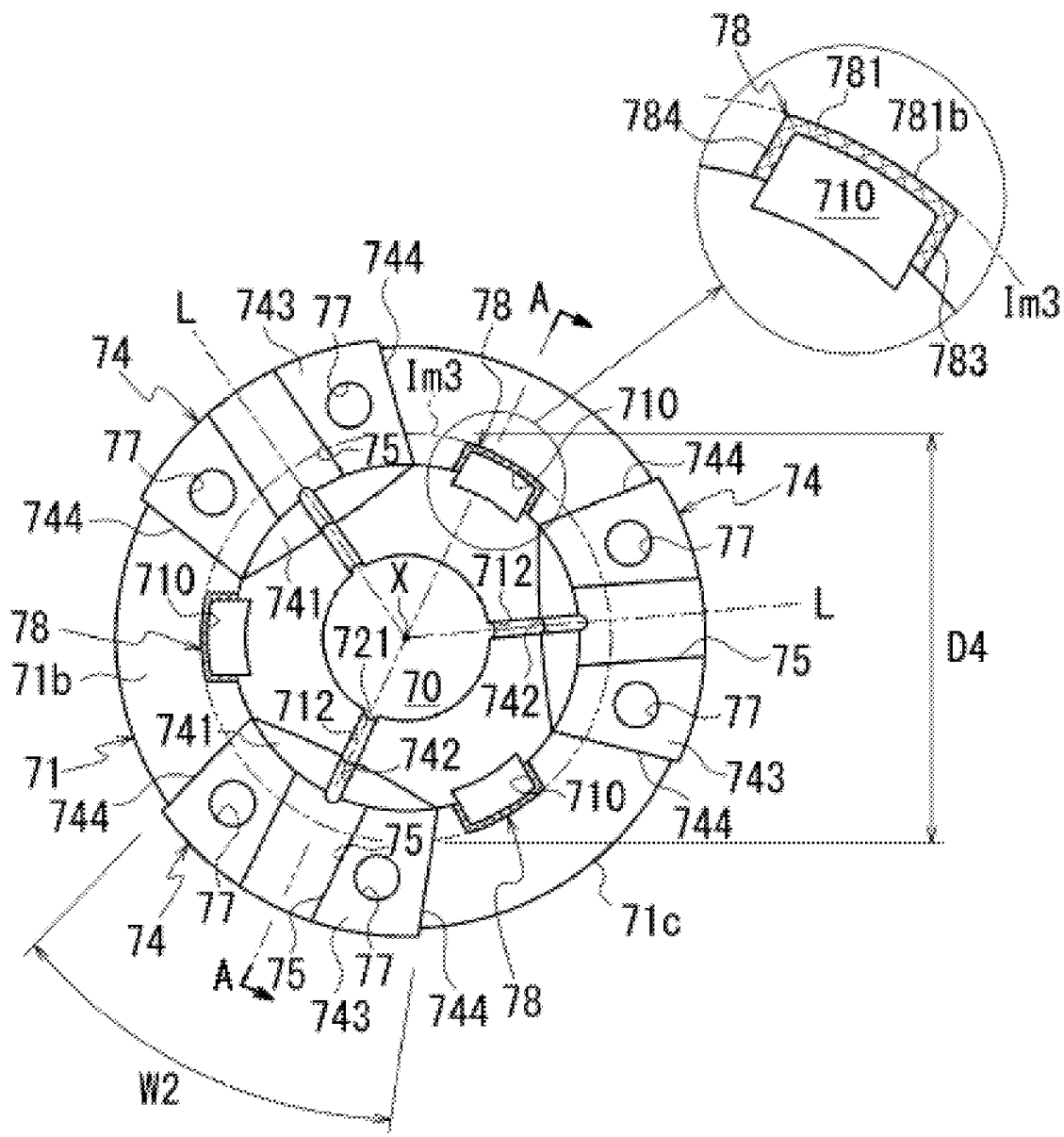
FIG. 16 is a plan view of the case member 7 viewed from the case member 6 side.

FIG. 16 is a plan view of the case member 7 viewed from the side of the case member 6. In FIG. 16, the guide portion 78 is hatched to make its position easier to understand.

Figure 17:
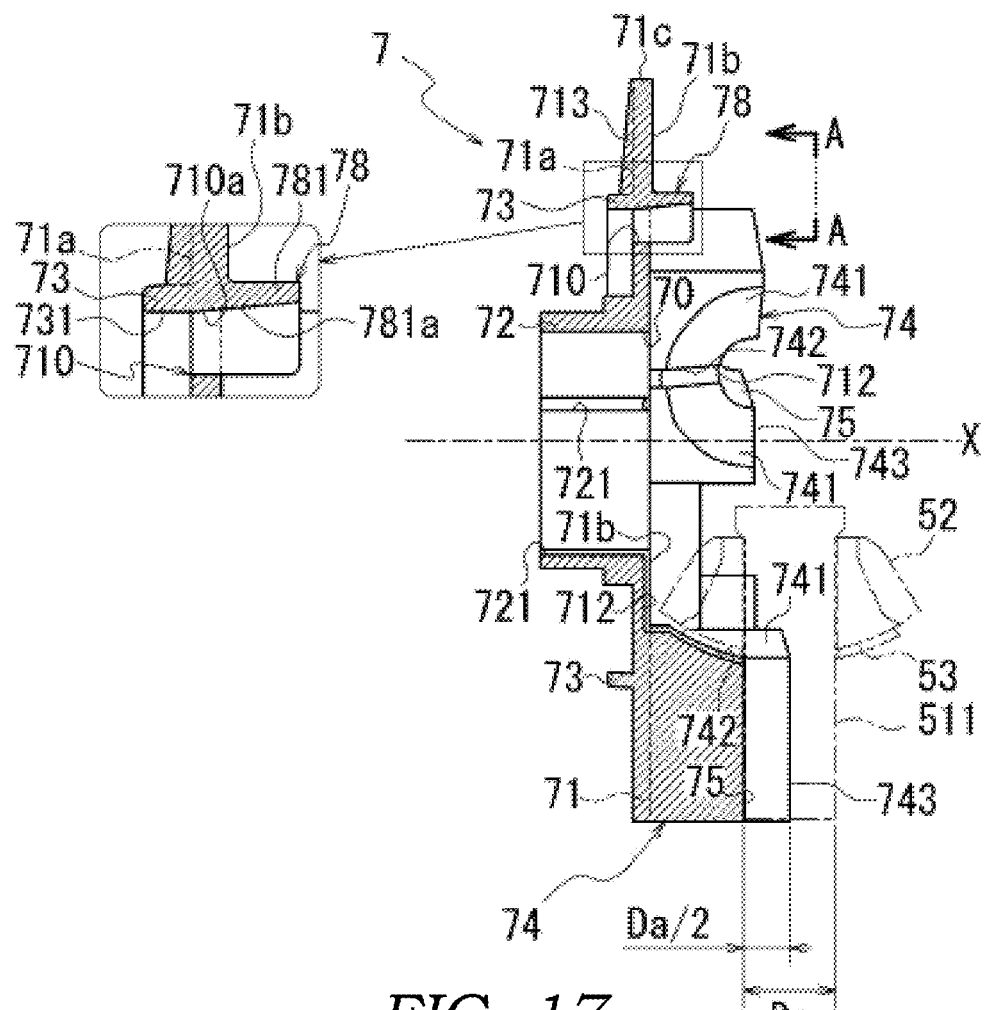
FIG. 17 is a schematic view of the A-A section in FIG. 16.

FIG. 17 is a schematic diagram of the A-A cross-section in FIG. 16. The arrangement of the pinion mate gear 52 is shown in dashed lines in FIG. 17. In FIG. 17, the boundary between the oil hole 710 and the guide portion 78 is shown in broken lines to make it easier to understand.

Figure 18:
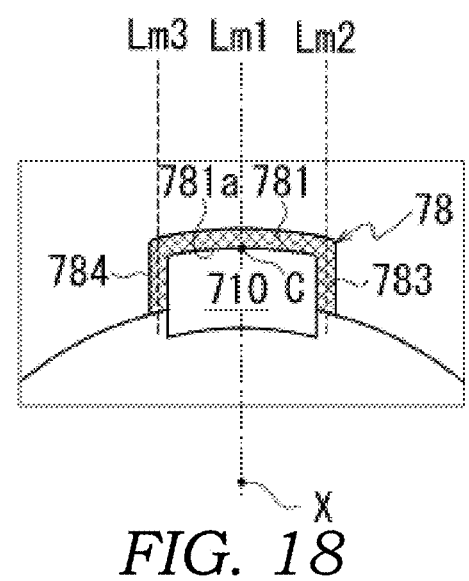
FIG. 18 is an arrow view of the A-A section in FIG. 17.

FIG. 18 is an A-A arrow view of FIG. 17. Cross-hatching is used in FIG. 18 to make the position of the guide portion 78 easier to understand.

Figure 19:
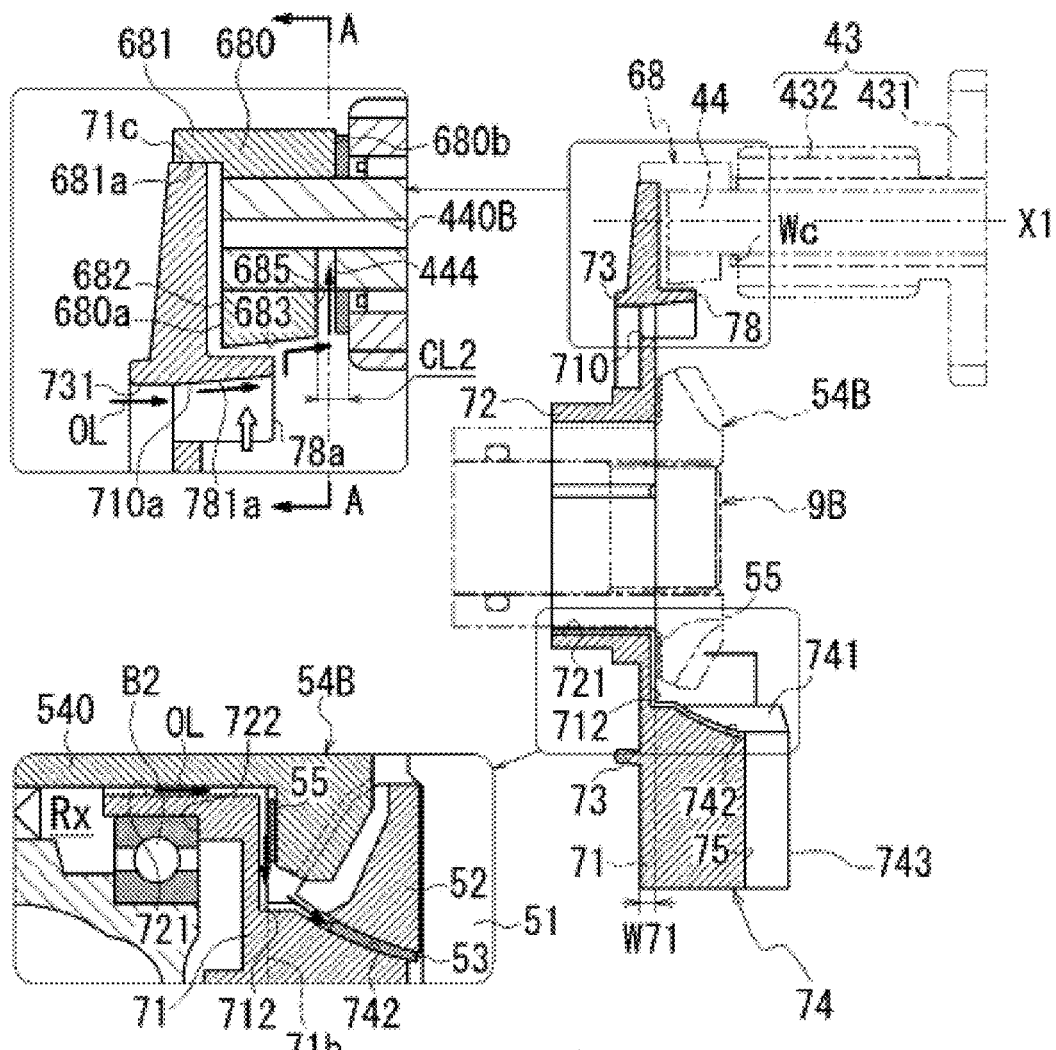
FIG. 19 is a schematic view of the A-A section in FIG. 16.

FIG. 19 is a schematic diagram of the A-A cross-section in FIG. 16. The illustration of the connecting portion 74 on the far side of the page is omitted in FIG. 19. In FIG. 19, the stepped pinion gear 43, plate portion 68, side gear 54B, and drive shaft 9B are shown in dashed lines.

Figure 20:
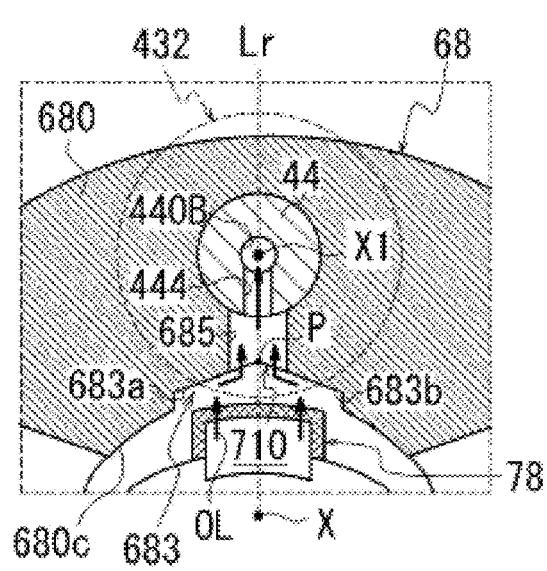
FIG. 20 is a schematic view of the A-A section in FIG. 19.

FIG. 20 is a schematic diagram of the A-A cross-section in FIG. 19.

As shown in FIGS. 13 and 14, the case member 7 has a ring-shaped base 71 (plate) when viewed from the direction of the rotation axis X.

The base 71 is a plate member having a thickness W71 (see FIG. 19) in the direction of the rotation axis X. A through-hole 70 is provided in the central portion of the base 71. The through-hole 70 passes through the base 71 in the thickness direction. The diameter (2R4, see FIG. 14) of the outer circumferential surface 71*c* of the base 71 is slightly smaller than the diameter D1 of a virtual circle Im1 (see FIG. 8) (2R4<D1). The virtual circle Im1 is formed along the inner circumferential surface 681*a* of the outer circumferential wall portion 681 of the plate portion 68 as described above.

As shown in FIG. 17, one end surface 71*a* and the other end surface 71*b* of the base 71 in the direction of the rotation axis X are flat surfaces perpendicular to the rotation axis X. On one end face 71*a* of the base 71, a tubular wall portion 72 and a guide portion 73 (the second guide portion) are provided. The tubular wall portion 72 surrounds a through-hole 70, and the guide portion 73 surrounds the tubular wall portion 72. As shown in FIG. 14, the guide portion 73 is annular when viewed from the direction of the rotation axis X.

As shown in FIGS. 13 and 14, three ribs 711 are provided on the inner diameter side of the guide portion 73 of the base 71. The three ribs 711 are provided at intervals in the circumferential direction around the rotation axis X. These ribs 711 are formed on one end face 71*a* of the base 71, and extend linearly in the radial direction of the rotation axis X.

The ribs 711 are provided so as to span across the outer diameter side guide portion 73 and the inner diameter side tubular wall portion 72.

As shown in FIG. 14, oil holes 710 (openings) penetrating through the base 71 in the thickness direction are provided between the three ribs 711 arranged in the circumferential direction around the rotation axis X. The oil holes 710 are opened on the outer and inner sides of the differential case 50 in the direction of the rotation axis X.

In addition, three ribs 713 are provided on the outer diameter side of the guide portion 73 at the base 71. The three ribs 713 are provided with intervals in the circumferential direction around the rotation axis X. These ribs 713 are formed on one end surface 71*a* of the base 71. The ribs 713 extend linearly in the radial direction of the rotation axis X from the guide portion 73 toward the outer circumferential surface 71*c* of the base 71.

Bolt accommodating portions 76, 76, which are recessed toward the back of the paper, are provided on the base 71 between adjacent ribs 713. These bolt accommodating portions 76, 76 are provided in positions that are symmetric with respect to a radius line L. The bolt accommodating portion 76 is opened on the outer circumferential surface 71*c* of the base 71.

A bolt insertion hole 77 is opened inside the bolt accommodating portion 76. The insertion hole 77 penetrates through the base 71 in the thickness direction (direction of rotation axis X).

In the base 71, the three ribs 713 are formed on the outer diameter side of the oil holes 710 in the radial direction of the rotation axis X.

As shown in FIG. 14, oil holes 710 in the case member 7 are provided at intervals in the circumferential direction around the rotation axis X.

As shown in the enlarged region of FIG. 14, the oil holes 710 have a substantially rectangular shape when viewed from the direction of the rotation axis X. The oil holes 710 are composed of long sides 710*a* and 710*b* that extend along the circumferential direction around the rotation axis X, and short sides 710*c* and 710*d* that connect the end portions of these long-side portions 710*a* and 710*b*. In the oil holes 710, the long-side portion 710*a* is positioned on the outer diameter side relative to the long-side portion 710*b*.

As shown in FIGS. 15 and 16, three guide portions 78 (first guide portions) are provided on the other end surface 71*b* on the case member 6 side at the base 71. The three guide portions 78 surround oil holes 710, and are arranged at intervals in the circumferential direction around the rotation axis X.

The guide portions 78 are continuous walls that surround the oil holes 710 and open toward the inner diameter side. Specifically, as shown in the enlarged area of FIG. 15, each guide portion 78 includes a long wall portion 781 that extends along the long side portion 710*a* of the oil hole 710, and short wall portions 783 and 784 that extend along the short side portions 710*c* and 710*d* of the oil hole 710. The long wall portion 781 and the short wall portions 783 and 784 are formed integrally.

As shown in FIG. 16, the outer circumferential surface 781*b* of the long wall portion 781 overlaps with a virtual circle Im3 having a diameter D4. The diameter D4 of the virtual circle Im3 is smaller than the diameter D2 of a virtual circle Im2 (see FIG. 8). The virtual circle Im2 extends along the inner circumferential surface 680*c* of the base 680 in the plate portion 68 of the case member 6, as mentioned above.

As shown in FIG. 18, when viewed from the direction of the rotation axis X, the long wall portion 781 of the guide portions 78 is a curved wall extending in the circumferential direction around the rotation axis X. The short wall portions 783 and 784 extend radially inward from both ends of the long wall portion 781 in the circumferential direction around the rotation axis X. The short wall portions 783 and 784 extend linearly along lines Lm2 and Lm3, respectively. The lines Lm2 and Lm3 are parallel to a line Lm1. The line Lm1 is a straight line passing through the rotation axis X and the midpoint C of the inner circumferential surface 781a of the long wall portion 781 in the circumferential direction around the rotation axis X.

In the enlarged area of FIG. 15, the boundary between the oil hole 710 and the guide portions 78 is shown with a broken line.

As shown in the enlarged area of FIG. 15, the inner circumferential surface 781a of the long wall portion 781 and the inner circumferential surfaces 783a and 784a of the short wall portions 783 and 784 are located in front of the broken line relative to the paper surface. The long side portion 710a of the oil hole 710 and the short wall portions 783 and 784 are located behind the broken line relative to the paper surface. The inner circumferential surface 781a is connected to the long side portion 710a without any step. The inner circumferential surfaces 783a and 784a are connected to the short side portions 710d and 710c, respectively, without any step.

As shown in FIG. 17, the guide portions 73 and 78 extend in a direction away from the base 71 in the direction of the rotation axis X. When viewed radially from the rotation axis X, the inner circumferential surface 731 of the guide portion 73 is a flat surface parallel to the rotation axis X. The long-side portion 710a of the oil hole 710 is connected to the inner circumferential surface 731 of the guide portion 73 on the end surface 71a side of the base 71 in the direction of the rotation axis X. The long-side portion 710a of the oil hole 710 is an inclined surface. The long-side portion 710a is inclined so as to be positioned on the outer diameter side as it moves away from the inner circumferential surface 731 of the guide portion 73 in the direction of the rotation axis X. The long-side portion 710a of the oil hole 710 is connected to the inner circumferential surface 781a of the long wall portion 781 of the guide portion 78 on the other end surface 71b side of the base 71 in the direction of the rotation axis X.

The inner circumferential surface 781a of the long wall portion 781 of the guide portion 78 is an inclined surface. The inner circumferential surface 781a is inclined so as to be positioned on the outer diameter side as it moves away from the inner circumferential surface 731 of the guide portion 73 in the direction of the rotation axis X. The inclination angle of the inner circumferential surface 781a of the long wall portion 781 is the same as the inclination angle of the long-side portion 710a of the oil hole 710.

As shown in FIGS. 15 and 16, three connecting portions 74 (protrusions) are provided on the other end surface 71b of the base 71 on the case member 6 side.

The connecting portions 74 are provided at equal intervals in the circumferential direction around the rotation axis X. As shown in FIG. 15, the connecting portions 74 have a leading end surface 743 protruding toward the case member 6 side. The connecting portions 74 also have side wall portions 744 connecting both end portions in the circumferential direction around the rotation axis X of the leading end surface 743 and the base 71.

Figure 21:
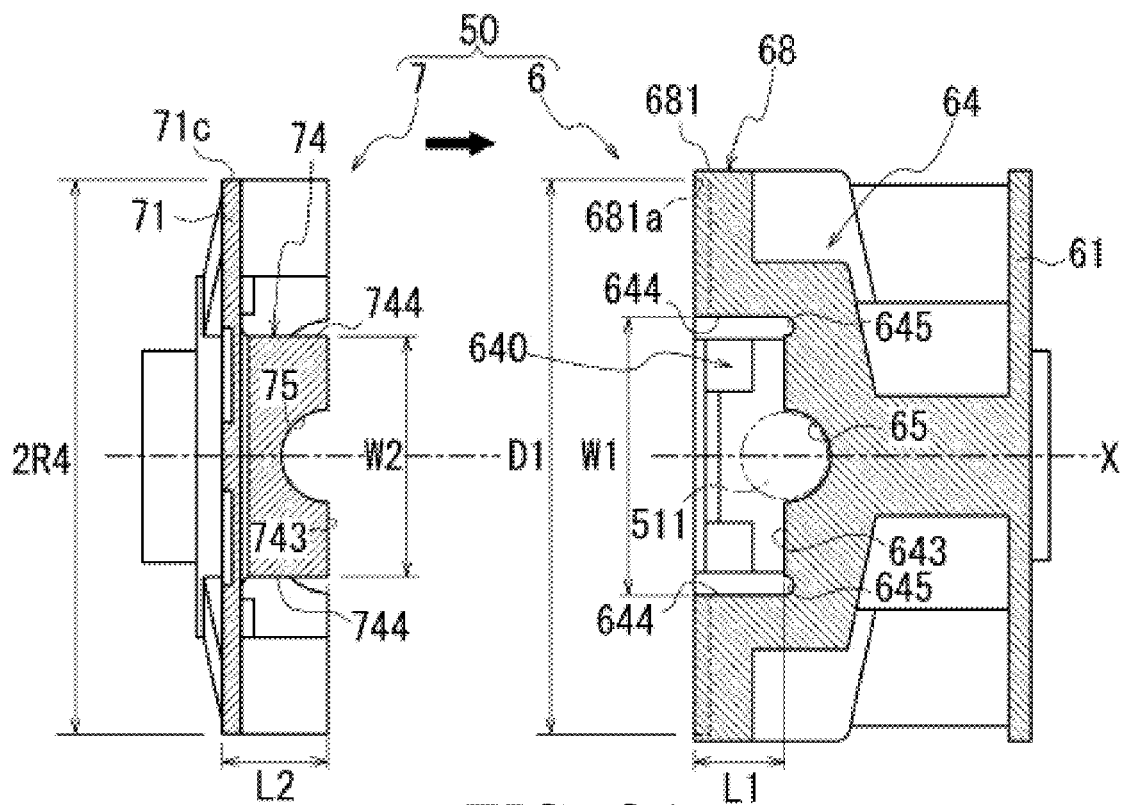
FIG. 21 is a parts diagram illustrating the assembly of the case member 6 and the case member 7.

As shown in FIG. 5 and FIG. 21 to be described later, the connecting portions 74 have a circumferential width W2. The recess 640 of the connecting portion 64 on the case member 6 side has a circumferential width W1 (see FIG. 5). The width W2 is smaller than the width W1. The width W1 refers to the length from the side wall portion 644 connected to one end in the circumferential direction around the rotation axis X of the bottom surface portion 643 to the side wall portion 644 connected to the other end. The width W2 refers to the length from the side wall portion 744 connected to one end in the circumferential direction around the rotation axis X of the leading end surface 743 to the side wall portion 744 connected to the other end.

As shown in FIG. 16, the leading end surface 743 of the connecting portions 74 is a curved surface extending along the circumferential direction of the rotation axis X when viewed from the direction of the rotation axis X. As shown in FIG. 15, the side wall portion 744 extends from the leading end surface 743 toward the base 71 in the direction of the rotation axis X. The bolt insertion hole 77 opens in the leading end surface 743, and one end of the bolt insertion hole 77 opens to the bolt accommodating portion 76 (see FIG. 13), penetrating through the base 71 in the thickness direction (the direction of the rotation axis X). The other end of the penetration hole 77 opens in the leading end surface 743. As shown in FIG. 16, a support groove 75 (first cutout portion) is provided in the leading end surface 743. The support groove 75 supports the pinion mate shaft 51. The support groove 75 is formed between the bolt insertion holes 77 in the circumferential direction of the rotation axis X.

As shown in FIG. 17, the support groove 75, when viewed from the direction of the rotation axis X, is formed linearly along the radius line L of the base 71. The support groove 75 is formed by crossing the connecting portion 74 from the inner diameter side to the outer diameter side.

The support groove 75 is semi-circular. The support groove 75 is formed by cutting out the leading end surface 743 along the outer diameter of the shaft member 511.

As shown in FIG. 17, the support groove 75 is formed at a depth that can accommodate half of the cylindrical shaft member 511. That is, the support groove 75 is formed at a depth equivalent to half the diameter Da (=Da/2) of the shaft member 511.

As shown in FIG. 13, the outer circumferential surface 74a of the connecting portion 74 protrudes radially outward from the outer circumferential surface 71c of the base 71 in the direction of the rotation axis X. The outer circumferential surface 74a of the connecting portion 74 and the outer circumferential surface 71c of the base 71 are connected by a step portion 79. That is, the step portion 79 is provided on the outer circumferential surface of the boundary between the connecting portion 74 and the base 71. As shown in FIG. 14, the outer circumferential surface 74a is located on the connecting portion 74 side of the step portion 79, and the outer circumferential surface 71c is located on the base 71 side. The radius R3 of the outer circumferential surface 74a is longer than the radius R4 of the outer circumferential surface 71c. Here, R3 and R4 respectively denote the radius from the rotation axis X.

As shown in FIGS. 15 and 16, an arc portion 741 is provided on the inner diameter side (rotation axis X side) of the connecting portion 74. The arc portion 741 follows the outer circumference of the pinion mate gear 52.

In the arc portion 741, the outer circumference of the pinion mate gear 52 is supported via a spherical washer 53 (see FIG. 17).

In the arc portion 741, an oil groove 742 is provided along the above-mentioned radius line L. The oil groove 742 is provided in the range from the support groove 75 of the shaft member 511 to the base 71 located on the inner circumference of the connecting portion 74.

The oil groove 742 communicates with an oil groove 712 provided in the other end surface 71b of the base 71. As shown in FIG. 16, the oil groove 712 is provided along the radius line L when viewed from the direction of the rotation axis X. The oil groove 712 is formed up to the through-hole 70 provided in the base 71.

As shown in the magnified area below FIG. 19, a ring-shaped washer 55 is placed on the other end surface 71b of the base 71. The washer 55 supports the back surface of the side gear 54B. A cylindrical tubular wall portion 540 is provided on the back surface of the side gear 54B. The washer 55 is extrapolated to the tubular wall portion 540.

As shown in FIG. 19, an oil groove 721 is formed on the inner circumference of a tubular wall portion 72 surrounding the through-hole 70. The oil groove 721 is formed at a position where it intersects with the oil groove 712. On the inner circumference of the tubular wall portion 72, the oil groove 721 is provided along the direction of the rotation axis X, over the entire length of the tubular wall portion 72 in the direction of the rotation axis X.

FIG. 21 is a parts diagram illustrating the assembly of the case members 6 and 7.

Figure 22:
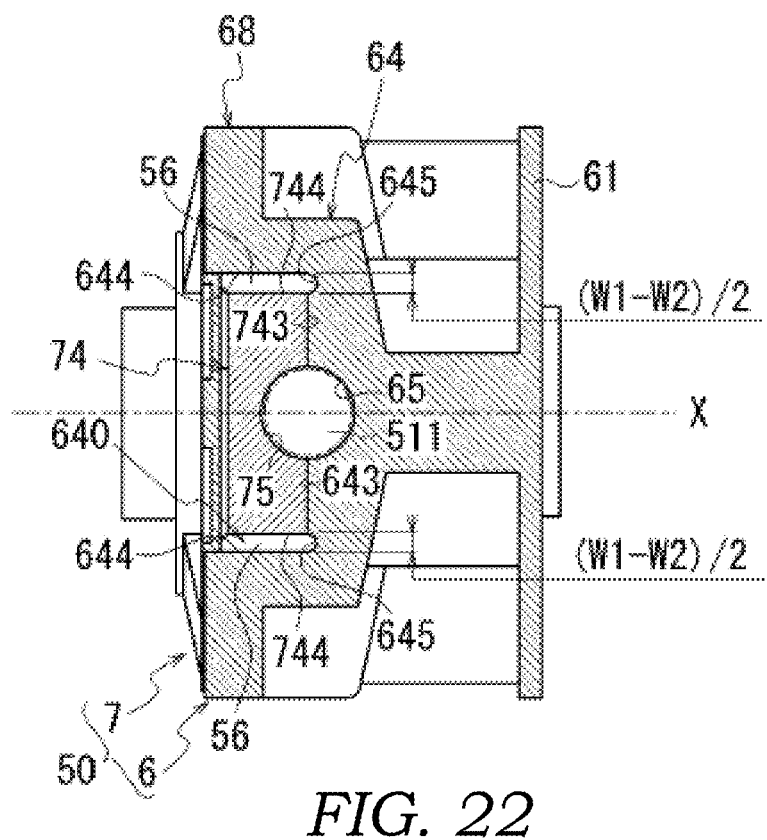
FIG. 22 is a parts diagram illustrating the assembly of the case member 6 and the case member 7.

FIG. 22 is a parts diagram illustrating the assembly of the case members 6 and 7.

FIG. 21 shows the state before the assembly of the case members 6 and 7, while FIG. 22 shows the state after the assembly of the case members 6 and 7. FIGS. 21 and 22 show the differential case 50 viewed from the A-A direction in FIG. 4. Hatching is applied to the connecting portions 64 and 74 for ease of viewing. The shaft member 511 of the pinion mate shaft 51 is shown in dashed lines in FIGS. 21 and 22.

As shown in FIG. 21, the differential case 50 is constructed by assembling the case members 6 and 7 in the direction of the rotation axis X. That is, the direction of the rotation axis X follows the assembly direction of the differential case 50. As shown in FIG. 22, the connecting portion 74 (convex portion) of the case member 7 is inserted into the recess 640 of the connecting portion 64 of the case member 6.

As shown in FIG. 21, the length L2 of the side wall portion 744 of the case member 7 in the direction of the rotation axis X matches the length L1 of the side wall portion 644 of the case member 6 in the direction of the rotation axis X. Therefore, as shown in FIG. 22, the leading end surface 743 of the connecting portion 74 inserted into the recess 640 contacts the bottom surface portion 643. This determines the position of the case members 7 and 6 in the direction of the rotation axis X.

As shown in FIG. 21, the outer circumferential surface 71c of the base 71 of the case member 7 is fitted into the inner circumferential surface 681a of the outer circumferential wall portion 681 on the plate portion 68 of the case member 6. As shown in FIG. 22, the case members 7 and 6 are concentrically arranged on the rotation axis X.

As mentioned above, the case members 6 and 7 are joined to each other by bolts B (see FIG. 5) that penetrate through the connecting portion 74 on the side of the case member 7 and are screwed into bolt holes 67 and 67 on the side of the case member 6.

As shown in FIG. 22, the support grooves 65 of the bottom surface portion 643 and 75 of the leading end surface 743 are formed at positions that overlap when viewed from the direction of the rotation axis X. When the bottom surface portion 643 and the leading end surface 743 are in contact with each other, the semi-circular support grooves 65 and 75 face each other. The support grooves 65 and 75 are symmetrical with respect to a line that passes through the bottom surface portion 643 and the leading end surface 743. The opening of the support grooves 65 and 75 communicate with each other, forming a circular hole along the outer diameter of the shaft member 511 as a whole. The shaft member 511 is inserted and held in this circular hole.

As shown in FIG. 21, the width W1 in the circumferential direction around the rotation axis X of the recess 640 is greater than the width W2 in the circumferential direction around the connecting portion 74 (W1>W2). Therefore, as shown in FIG. 22, the side wall portion 644 of the recess 640 faces the side wall portion 744 of the connecting portion 74 with a gap therebetween. This gap forms an oil passage 56 that communicates with the inside and outside of the differential case 50. The oil passage 56 is formed on both end sides of the connecting portion 74 in the circumferential direction around the rotation axis X. The circumferential width of each oil passage 56 around the rotation axis X is (W1−W2)/2.

The oil passage 56 is located between the recess 640 and the connecting portion 74 in the circumferential direction around the rotation axis X of the differential case 50. In FIG. 6, the position of the oil passage 56 is indicated by hatching on the case member 6. The oil passage 56 extends from the inner diameter side end of the connecting portion 64 to the outside in the radial direction of the rotation axis X and opens to the outer circumferential surface of the differential case 50. The pinion mate gear 52 and the side gear 54B are accommodated on the inner diameter side of the connecting portion 64. The oil OL that the pinion mate gear 52 and the side gear 54B have stirred flows into the inner diameter side end of the oil passage 56. The oil passage 56 discharges the oil OL to the outside of the differential case 50 by centrifugal force.

As shown in FIG. 22, the oil passage 56 has a longitudinal shape extending in the direction of the rotation axis X. At one end of the oil passage 56 in the direction of the rotation axis X, a groove portion 645 is located. As shown in FIG. 7, the groove portion 645 is formed at the boundary between the bottom surface portion 643 and the side wall portion 644. The groove portion 645 extends in the radial direction of the rotation axis X. At the other end of the oil passage 56 in the direction of the rotation axis X, the base 71 of the case member 7 is located.

As shown in the enlarged area of FIG. 19, the outer circumferential surface 71c of the base 71 of the case member 7 is fitted into the inner circumferential surface 681a of the outer circumferential wall portion 681 of the plate portion 68 of the case member 6.

The guide portion 78 of the case member 7 is disposed on the inner diameter side of the oil receiving portion 682 of the case member 6. In this state, the leading end surface 78a of the guide portion 78 is located between one end surface 680a and the other end surface 680b of the oil receiving portion 682 in the direction of the rotation axis X. The guide portion 78 of the case member 7, the oil receiving portion 682 of the case member 6, and the pinion shaft 44 overlap in the radial direction of the rotation axis X.

FIG. 20 shows a diameter line Lr passing through the rotation axis X and the axis line X1. When viewed from the radial direction of the rotation axis X, the oil hole 710 of the case member 7, the guide portion 78, the recess 683 of the case member 6, the oil groove 685, the oil hole 444 of the pinion shaft 44, and the axial internal oil passage 440B are arranged in order along the diameter line Lr. When viewed from the radial direction of the rotation axis X, the oil hole 710, the guide portion 78, the recess 683, the oil groove 685, the oil hole 444, and the axial internal oil passage 440B overlap with each other. The vertex P of the recess 683 is located on the diameter line Lr.

As shown in FIG. 19, the differential case 50 has the bearing B2 extrapolated to the tubular wall portion 72 of the case member 7. The bearing B2 is in contact with the inner race on the step portion 722 provided on the outer circumference of the tubular wall portion 72 from the direction of the rotation axis X. The bearing B2 extrapolated to the tubular wall portion 72 is held by the support portion 145 of the fourth box 14. The tubular wall portion 72 of the differential case 50 is rotatably supported by the fourth box 14 (see FIG. 4) through the bearing B2.

As shown in FIG. 4, the drive shaft 9B penetrating the opening 145a of the support portion 145 of the fourth box 14 is inserted from the direction of the rotation axis X and is rotatably supported by the support portion 145. The tubular wall portion 72 functions as a shaft support portion that supports the outer circumference of the drive shaft 9B.

A lip seal RS is fixed to the inner circumference of the opening 145a. The unillustrated lip portion of the lip seal RS elastically contacts the outer circumference of the tubular wall portion 540 of the side gear 54B extrapolated to the drive shaft 9B.

Thereby sealing the gap between the outer circumference of the tubular wall portion 540 of the side gear 54B and the inner circumference of the opening 145a.

The case member 6 of the differential case 50 is supported by the plate member 8 via a bearing B3 extrapolated to the tubular wall portion 611 (see FIG. 2).

Inside the case member 6, a drive shaft 9A that penetrates through the through-hole 130a of the third box 13 is inserted from the direction of the rotation axis X.

The drive shaft 9A is provided to cross the motor shaft 20 of the motor 2 and the inner diameter side of the sun gear 41 of the planetary reduction gear 4 in the direction of the rotation axis X.

As shown in FIG. 4, inside the differential case 50, the side gears 54A and 54B are splined to the outer circumference of the leading end portions of the drive shafts 9A and 9B. The side gears 54A and 54B are integrally rotatably connected to the drive shafts 9A and 9B around the rotation axis X.

In this state, the side gears 54A and 54B are arranged opposite to each other with a gap in the direction of the rotation axis X. The central member 510 of the pinion mate shaft 51 is positioned between the side gears 54A and 54B.

In this embodiment, three shaft members 511 of the pinion mate shaft 51 extend radially outward from the central member 510. A pinion mate gear 52 is supported on each of the shaft members 511 of the pinion mate shaft 51. The side gear 54A is positioned on one side of the rotation axis X of the pinion mate gear 52, and the side gear 54B is positioned on the other side. The pinion mate gears 52 are assembled in a state where their teeth portions are engaged with each other on the side gears 54A and 54B.

As shown in FIG. 2, the inside of the fourth box 14 stores lubricating oil OL. The lower side of the differential case 50 is located within the stored oil OL.

The stored oil OL is stored up to the height at which, for example, the connecting beam 62 is located within the oil OL when the connecting beam 62 is located at the lowest position.

The stored oil OL is scraped up by the differential case 50 rotating around the rotation axis X during the transmission of the output rotation of the motor 2.

As shown in FIG. 2, an oil catch portion 15 is provided above the fourth box 14. Part of the oil OL scraped up by the differential case 50 rotating around the rotation axis X flows into the oil catch portion 15.

The oil catch portion 15 is connected to an oil passage 151a that extends on the inner diameter side of the fourth box 14. As shown in FIG. 2, the inner diameter end of the oil passage 151a is opened between the lip seal RS and the bearing B2.

The oil catch portion 15 is also connected to an oil hole 136a (see FIG. 2) provided in the cylindrical connecting wall 136 of the third box 13 via an unillustrated piping.

Part of the oil OL scraped up by the differential case 50 rotating around the rotation axis X reaches the oil catch portion 15. The oil OL is supplied to the internal space Sc of the connecting wall 136 through the guide portion 154 of the oil catch portion 15 and the piping 127.

The third box 13 has a radial oil passage 137 that communicates with the internal space Sc.

The radial oil passage 137 extends radially downward from the internal space Sc. The radial oil passage 137 communicates with a axial oil passage 138 provided in the joint portion 132.

A communication hole 112a is provided in the joint portion 112 of the first box 11. The axial oil passage 138 communicates with an oil pooling portion 128 provided in the lower part of the second box 12 via the communication hole 112a.

The oil pooling portion 128 passes through the circumferential wall portion 121 in the direction of the rotation axis X. The oil pooling portion 128 communicates with the second gear chamber Sb2 provided in the fourth box 14.

The operation of the power transmission device 1 with such a configuration will be described.

As shown in FIG. 1, the power transmission device 1 includes a planetary reduction gear 4, a differential mechanism 5, and drive shafts 9A and 9B provided along the transmission path of the output rotation of the motor 2.

As shown in FIG. 2, when the motor 2 is driven, the rotor core 21 rotates about the rotation axis X, and the motor shaft 20 rotates integrally with the rotor core 21. The output rotation of the motor 2 is input to the sun gear 41 of the planetary reduction gear 4 via the motor shaft 20.

As shown in FIG. 3, the sun gear 41 serves as the input part of the output rotation of the motor 2 in the planetary reduction gear 4. The differential case 50 supporting the stepped pinion gear 43 serves as the output part of the input rotation.

When the sun gear 41 rotates about the rotation axis X with the input rotation, the stepped pinion gear 43 (large diameter gear portion 431, small diameter gear portion 432) rotates about the axis line X1 with the input rotation from the sun gear 41 side.

Here, the small diameter gear portion 432 of the stepped pinion gear 43 is engaged with the ring gear 42 fixed to the inner circumference of the fourth box 14. Therefore, while the stepped pinion gear 43 rotates about the axis line X1, it revolves around the rotation axis X. The drive shaft 9B is located on the inner circumference of the revolving orbit of the stepped pinion gear 43.

The outer diameter R2 of the small diameter gear portion 432 of the stepped pinion gear 43 is smaller than the outer diameter R1 of the large diameter gear portion 431 (see FIG. 3).

As a result, the differential case 50 (case members 6 and 7) supporting the stepped pinion gear 43 rotates about the rotation axis X at a lower rotational speed than the input rotation from the motor 2.

Therefore, the rotation input to the sun gear 41 of the planetary reduction gear 4 is greatly reduced by the stepped pinion gear 43. The reduced rotation is output to the differential case 50 (differential mechanism 5).

Then, by rotating the differential case 50 with the inputted rotation about the rotation axis X, the drive shafts 9A and 9B that engage with the pinion mate gear 52 within the differential case 50 rotate around the rotation axis X. As a result, the left and right drive wheels W, W of the vehicle equipped with the power transmission device 1 (refer to FIG. 1) rotate with the transmitted rotational driving force.

As shown in FIG. 2, lubricating oil OL is stored inside the fourth box 14 for lubrication purposes. Therefore, the stored oil OL is scraped up by the differential case 50 rotating around the rotation axis X when transmitting the output rotation of the motor 2.

The scraped-up oil OL lubricates the engagement portions between the sun gear 41 and the large diameter gear portion 431, between the small diameter gear portion 432 and the ring gear 42, and between the pinion mate gear 52 and the side gears 54A and 54B. Much of the oil OL scraped up by the differential case 50 flows into the oil catch portion 15.

Some of the oil OL that flowed into the oil catch portion 15 flows into an oil passage 151a, one end of which is open on the upper surface of the support base 151.

The inner diameter side end portion of the oil passage 151a is opened to the inner circumference of the support portion 145 (refer to FIG. 2). Therefore, the oil OL flowing into the oil passage 151a is discharged into a clearance Rx between the inner circumference of the support portion 145 of the fourth box 14 and the tubular wall portion 540 of the side gear 54B.

Oil OL discharged into the clearance Rx lubricates the bearing B2 supported by the support portion 145. The oil OL that lubricates the bearing B2 moves to the outer side (bearing B2 side) of the differential case 50 by the centrifugal force of the rotation of the differential case 50.

On the outer circumference of the differential case 50, a guide portion 73 that forms a ring shape when viewed from the direction of the rotation axis X is provided. Therefore, the oil OL that has moved to the outer diameter side is captured by a portion of the guide portion 73. As shown in FIG. 14, ribs 711 are provided on the inner circumferential side of the guide portion 73. A recess is formed between the guide portion 73, the ribs 711, and the tubular wall portion 72. This recess makes it easier for the oil OL to accumulate on the inner circumferential side of the guide portion 73.

As shown in FIG. 19, oil holes 710 are provided along the inner circumferential surface 731 of the guide portion 73 at the base 71 of the case member 7. The oil OL is prevented from further moving to the outer diameter side by the guide portion 73. The oil OL whose movement is obstructed passes through the oil hole 710 that opens to the inner circumference of the guide portion 73 to the case member 6 side.

The oil OL reaches the inner circumferential surface 731 of the guide portion 73 by the centrifugal force generated by the rotation of the differential case 50. Many of the oil OL that have reached the inner circumferential surface 731 of the guide portion 73 flow into the oil hole 710 that opens in the direction of the rotation axis X without passing over the guide portion 73.

As shown in FIG. 19, the oil OL supplied to the oil hole 710 moves to the guide portion 78. The long side portion 710a of the oil hole 710 and the inner circumferential surface 781a of the long wall portion 781 of the guide portion 78 are inclined to the radial outer side as they move away from the inner circumferential surface 731 of the guide portion 73 in the direction of the rotation axis X.

Therefore, the oil OL passing through the oil hole 710 and the guide portion 78 moves along the inclination while being subjected to centrifugal force. This promotes the movement of the oil OL towards the case member 6 side. In addition, due to this inclination, it is possible to reduce the re-entry of the oil OL that has moved from the guide portion 73 to the case member 6 side back to the guide portion 73, and discharge it to the outside of the differential case 50.

As mentioned earlier, the guide portion 78 is a continuous wall composed of a long wall portion 781, short wall portions 783 and 784 (see FIG. 18). When viewed from the direction of the rotation axis X, the guide portion 78 opens toward the inner diameter side. This allows the guide portion 78 to catch not only the oil OL flowing from the oil hole 710 but also the oil OL that scatters inside the differential case 50 (white arrow in FIG. 19).

As shown in FIGS. 19 and 20, the oil OL that has moved from the oil hole 710 to the case member 6 side through the guide portion 78 is discharged from the leading end surface 78a. The inner circumferential surface 680c of the oil receiving portion 682 and the recess 683 are transversely arranged from the base 71 side of the case member 7 to the pinion gear 43 side along the direction of the rotation axis X at the leading end surface 78a of the guide portion 78.

Therefore, the oil OL discharged from the leading end surface 78a of the guide portion 78 is caught by the inner circumferential surface 680c and the recess 683 (see FIG. 20) after moving outward in the radial direction due to centrifugal force.

The inner circumferential surface 680c and the recess 683 are inclined in the radial direction outward as they move away from the guide portion 78 along the direction of the rotation axis X. The oil OL caught in the recess 683 moves along the inclination from one end surface 680a side to the other end surface 680b side of the oil receiving portion 682. Moreover, many of the oil OL caught on the inner circumferential surface 680c gather in the recess 683 during the movement along the inclination.

As shown in FIG. 20, when viewed from the direction of the rotation axis X, the oil OL in the recess 683 moves on the inclined surfaces 683a and 683b in the circumferential direction around the rotation axis X due to centrifugal force and gathers around the vertex P.

The recess 683 communicates with the oil groove 685 (clearance CL2) at the vertex P. The oil OL in the recess 683 is gathered at the vertex P by centrifugal force and then discharged into the oil groove 685. The oil OL in the oil groove 685 moves radially outward by centrifugal force and flows into the oil hole 444 of the pinion shaft 44. At this time, the washer We is also lubricated by the oil OL.

The oil OL flowing into the oil hole 444 of the pinion shaft 44 moves to the axial internal oil passage 440B and is finally discharged from the oil hole 443 (see FIG. 4). At this time, the oil OL lubricates the needle bearing NB.

Furthermore, a part of the oil OL discharged into the clearance Rx passes through the oil groove 721 provided on the inner circumference of the tubular wall portion 72 of the case member 7, as shown in FIG. 19. The oil OL that has passed through the oil groove 721 is supplied to the washer 55 that supports the back surface of the side gear 54B to lubricate the washer 55.

Furthermore, the oil OL passes through the oil groove 712 provided at the base 71 of the case member 7 and the oil groove 742 provided on the arc portion 741. The oil OL that has passed through the oil groove 742 is supplied to the spherical washer 53 that supports the back surface of the pinion mate gear 52 to lubricate the spherical washer 53.

In addition, a part of the oil OL caught by the oil catch portion 15 is supplied through a not-shown piping to the oil hole 136a (see FIG. 2) provided on the cylindrical connecting wall 136 of the third box 13.

The oil OL discharged into the internal space Sc from the oil hole 136a is stored in the internal space Sc. The oil OL also lubricates the bearing B4 supported by the circumferential wall portion 131 of the third box 13.

A portion of the oil OL discharged into the internal space Sc moves to the other end 20b side of the motor shaft 20 through the gap between the outer circumference of the drive shaft 9A and the inner circumference of the motor shaft 20.

As shown in FIG. 11, the other end 20b of the motor shaft 20 is inserted inside the tubular wall portion 541 of the side gear 54A. A communication passage 542 communicating with the back surface of the side gear 54A is provided on the inner circumference of the tubular wall portion 541.

Therefore, a portion of the oil OL discharged inside the tubular wall portion 541 flows through the communication passage 542 when it moves to the other end 20b side of the motor shaft 20. The oil OL that has passed through the communication passage 542 is supplied to the washer 55 on the back surface of the side gear 54A to lubricate the washer 55.

Furthermore, as shown in FIG. 11, the oil OL that lubricates the washer 55 on the back surface of the side gear 54A moves through the oil groove 662 provided on the gear support portion 66 of the case member 6 and the oil groove 642 provided on the arc portion 641. The oil OL that has passed through the oil groove 642 is supplied to the spherical washer 53 that supports the back surface of the pinion mate gear 52 to lubricate the spherical washer 53.

As shown in FIG. 2, the internal space Sc of the third box 13 communicates with the second gear chamber Sb2 provided in the fourth box 14 through the radial oil passage 137, the axial oil passage 138, the communication hole 112a, and the oil pooling portion 128 provided in the lower part of the second box 12.

Therefore, the oil OL in the internal space Sc is held at the same height position as the stored oil OL in the fourth box 14.

In this way, much of the oil OL swept up by the differential case 50 rotating around the X-axis flows into the oil catch portion 15. The oil OL is supplied from the oil catch portion 15 to the support portion 145 of the fourth box 14 to lubricate the bearing B2. The oil OL is also supplied to the internal space Sc of the third box 13 to lubricate the bearing B4.

Then, the oil OL that has lubricated these bearings B2 and B4 is finally returned to the fourth box 14 and swept up by the rotating differential case 50.

Thus, in the power transmission device 1, the oil OL in the fourth box 14 is swept up when the drive wheels W rotate and used for lubricating bearings and gear engagement parts. The oil OL used for lubrication is returned to the fourth box 14 and becomes available for sweeping up again.

Furthermore, in the power transmission device 1, by inserting and contacting the connecting portion 74 of the case member 7 into the recess 640 of the case member 6, the support groove 65 and the support groove 75 face each other to form a circular hole that supports the shaft member 511.

Therefore, in the embodiment, as shown in FIG. 21, the shaft member 511 can be assembled with the case members 6 and 7 while being pre-arranged in the support groove 65 of the recess 640.

In addition, three shaft members 511 can be pre-connected to the central member 510 and arranged in the case member 6. In this case, a pinion mate shaft 51, which is integrally molded with the shaft member 511 and the central member 510, can also be used.

In addition, the circumferential width W2 of the connecting portion 74 around the rotation axis X is set smaller than the circumferential width W1 of the recess 640. Therefore, the connecting portion 74 is easier to insert into the recess 640.

As shown in FIG. 22, when the case members 6 and 7 are assembled, a gap that serves as an oil passage 56 is formed between the recess 640 and the connecting portion 74. This oil passage 56 improves the discharge performance of the oil OL from the inside to the outside of the differential case 50. This can reduce the stirring resistance of the oil OL caused by the pinion mate gear 52 and the side gears 54A and 54B (see FIG. 5) located on the inner diameter side of the connecting portions 64 and 74.

In addition, as shown in FIG. 8, a groove portion 645 is formed at the boundary between the bottom surface portion 643 and the side wall portion 644 of the case member 6. This groove portion 645 extends along the oil passage 56 from the inner diameter side to the outer diameter side of the rotation axis X. The oil OL stirred by the pinion mate gear 52 and the side gears 54A and 54B enters the groove portion 645 and flows along the outer diameter side of the groove portion 645. This improves the discharge performance of the oil OL from the inside to the outside of the differential case 50.

One example of the power transmission device 1 in one aspect of the present invention is listed below:
(1) The power transmission device 1 includes
a differential case 50 (case) composed of a case member 7 (first case member) and a case member 6 (second case member) assembled together, and
a shaft member 511 supported by the differential case 50;
the power transmission device 1 has a connecting portion 74 (protrusion) protruding in the axial direction along the assembly direction of the differential case 50, provided on the case member 7, and
a recess 640 depressed in the axial direction along the rotation axis X provided on the case member 6.

The shaft member 511 is supported by the connecting portion 74 in the recess 640.

By configuring the power transmission device in this way, the freedom of assembly is improved.

Specifically, the shaft member 511 is pre-arranged in the recess 640 of the case member 6. The connecting portion 74 of the case member 7 is inserted into the recess 640 and brought into contact with the shaft member 511, and the case member 6 and the case member 7 are assembled. This improves the freedom of assembly compared to simply inserting the shaft member 511 into the hole of the differential case 50.

After assembling the case members 6 and 7, the assembly may be performed by inserting the shaft member 511 into the circular hole formed by the support grooves 65 and 75. In this case, the shaft member 511 and the central member 510 of the pinion mate shaft 51 are molded separately. The central member 510 is pre-arranged in the case member 6 together with the pinion mate gear 52 and the spherical washer 53, and the case member 7 is then assembled. Thereafter, the shaft member 511 is inserted into the circular hole and connected to the central member 510.

(2) In the power transmission device 1, the case member 7 preferably has a support groove 75 (first cutout portion) on the leading end surface 743 (leading end) of the connecting portion 74. The shaft member 511 is accommodated in the support groove 75.

By constructing in this way, the shaft member 511 is supported in the recess 640 while being accommodated in the support groove 75 of the connecting portion 74. This makes it possible to stably support the shaft member 511.

(3) In the power transmission device 1, the case member 6 preferably has a support groove 65 (second cutout portion) for accommodating the shaft member 511 in the recess 640.

By constructing in this way, the shaft member 511 is supported in the recess 640 while being accommodated in the support groove 65 of the recess 640. This makes it possible to stably support the shaft member 511. Furthermore, when the support groove 65 is provided in addition to the support groove 75, the shaft member 511 is accommodated in the support grooves 75 and 65 from both sides in the direction of the rotation axis X, and the shaft member 511 can be stably supported.

Furthermore, when the connecting portion 74 is accommodated in the recess 640, the support grooves 65 and 75 can be formed as semi-circular cutouts that are symmetrical with respect to the contact surfaces (leading end surface 743 and bottom surface portion 643).

This allows the support grooves 65 and 75 to form circular holes that match the outer diameter of the shaft member 511. By accommodating the shaft member 511 in these circular holes, the shaft member 511 can be stably supported.

(4) The power transmission device 1 preferably has an oil passage 56 between the recess 640 and the connecting portion 74 in the circumferential direction (circumferential direction) around the rotation axis X of the differential case 50.

The oil passage 56 opens on the outer circumferential surface of the differential case 50.

By configuring the power transmission device in this way, it becomes easier to discharge oil OL from the inside to the outside of the differential case 50 via the oil passage 56, thereby reducing the agitation resistance of the oil OL of the pinion mate gear 52 arranged inside the differential case 50.

In addition, in the embodiment, the width W1 in the circumferential direction around the rotation axis X of the recess 640 is set larger than the width W2 in the circumferential direction around the connecting portion 74. As a result, when the connecting portion 74 is inserted into the recess 640, the side wall portion 644 of the recess 640 faces the side wall portion 744 of the connecting portion 74 with a gap in between. In the embodiment, this gap is used as the oil passage 56. This eliminates the need to separately form the oil passage 56, thereby reducing manufacturing costs.

Note that the oil passage 56 is not limited to the gap between the side wall portion 644 and the side wall portion 744, and may be separately formed.

(5) The oil passage 56 preferably has an elongated shape extending in the longitudinal direction of the rotation axis X.

The oil passage 56 located between the recess 640 and the connecting portion 74 has a longitudinal shape that extends in the direction of the rotation axis X, which allows for clearance between the recess 640 and the connecting portion 74. This makes it easier to insert the connecting portion 74 into the recess 640 and to assemble the case members 6 and 7.

(6) The power transmission device 1 preferably has multiple shaft members 511.

Depending on the configuration of the embodiment, even when assembling multiple shaft members 511, it is possible to assemble the case members 6 and 7 with the shaft members 511 already arranged in the case member 6. This improves the freedom of assembly. Note that in the embodiment, an example was described in which the pinion mate shaft 51 has three shaft members 511, but the shaft members 511 may be two or four or more.

(7) The power transmission device 1 preferably has three or more shaft members 511.

Depending on the configuration of the embodiment, even when having three or more shaft members 511, it is possible to arrange the shaft members 511 in the case member 6 in advance and perform the assembly. This improves the freedom of assembly.

(8) The power transmission device 1 preferably has a pinion mate shaft 51 comprising multiple shaft members 511 and a central member 510 that supports the multiple shafts.

Depending on the configuration of the embodiment, it is possible to arrange the shaft members 511 and the central member 510 in the case member 6 in advance by connecting them, and perform the assembly. This improves the freedom of assembly. Note that the state of pre-connecting the shaft members 511 and the central member 510 includes a case where the shaft members 511 and the central member 510 are integrally molded.

(9) In the power transmission device 1, it is preferable that the central member 510 and the plurality of shaft members 511 are integrally molded.

By using the pinion mate shaft 51 in which the shaft member 511 and the central member 510 are integrally molded, the assembly efficiency can be improved.

(10) In the power transmission device 1, the case member 7 preferably has a base 71 (plate). The base 71 is connected to the connecting portion 74 and fitted to the case member 6.

Specifically, the case member 6 has a plate portion 68 that connects to the recess 640 of the connecting portion 64. The base 71 is provided on the side away from the case member 6 of the connecting portion 74. The plate portion 68 is provided on the side of the case member 7 of the recess 640. When assembling the case members 7 and 6, the connecting portion 74 is inserted into the recess 640 and the base 71 is fitted to the plate portion 68. This makes it possible to assemble with clearance without the need to fit the connecting portion 74 into the recess 640, improving the assembly performance.

(11) In the power transmission device 1, the case member 7 preferably has a step portion 79 provided on the outer circumferential surface at the boundary between the base 71 and the connecting portion 74. The radius R4 of the outer circumferential surface 71c on the base 71 side at the step portion 79 is smaller than the radius R3 of the outer circumferential surface 74a on the connecting portion 74 side.

By configuring in this way, the connecting portion 74 side of the case member 7 that supports the shaft member 511 is made thick to increase its rigidity, while the base 71 side, where rigidity is not required, is made thin, enabling the differential case 50 to be lightweight.

(12) In the power transmission device 1, the case member 6 preferably has a first portion 6A on the side of the case member 7 and a second portion 6B on the side away from the case member 7.

The case member 6 has a step portion 63a on the outer circumferential surface at the boundary between the first portion 6A and the second portion 6B.

By configuring in this way, it is possible to change the thickness of the first portion 6A and the second portion 6B of the case member 6 in the radial direction of the rotation axis X, enabling lightweighting of the differential case 50.

Deformation Example 1

Figure 23:
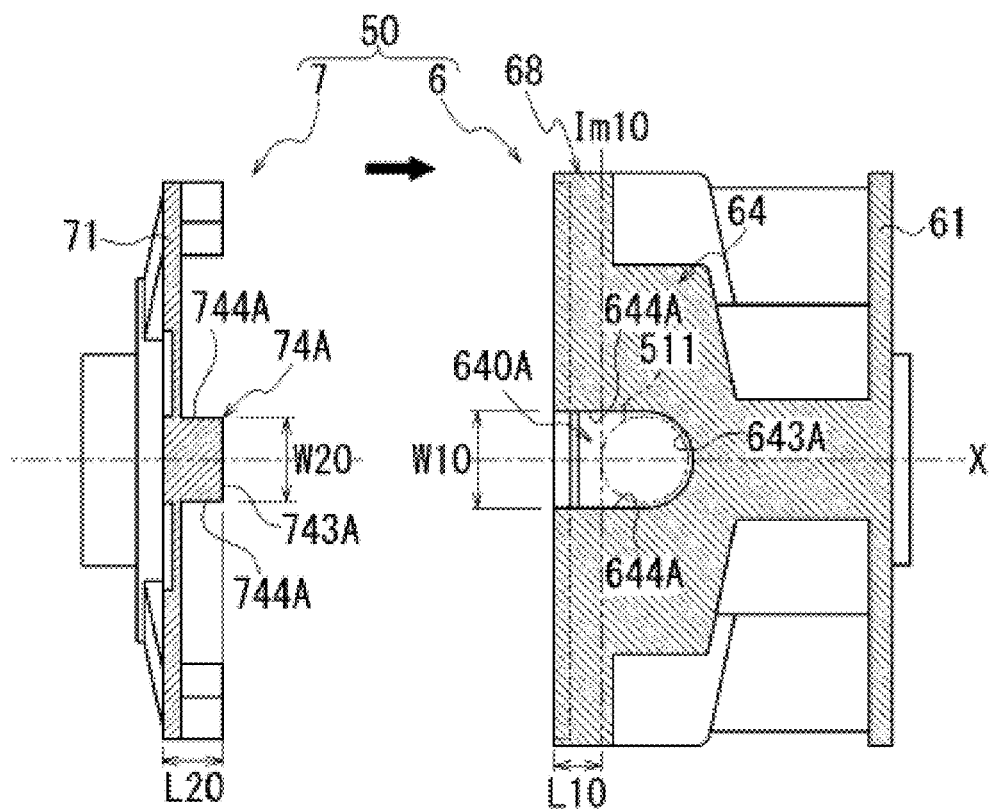
FIG. 23 is a parts diagram illustrating the assembly of the case member 6 and the case member 7 according to the first modification.

FIG. 23 is a parts diagram illustrating the assembly of case members 6 and 7 in deformation example 1.

Figure 24:
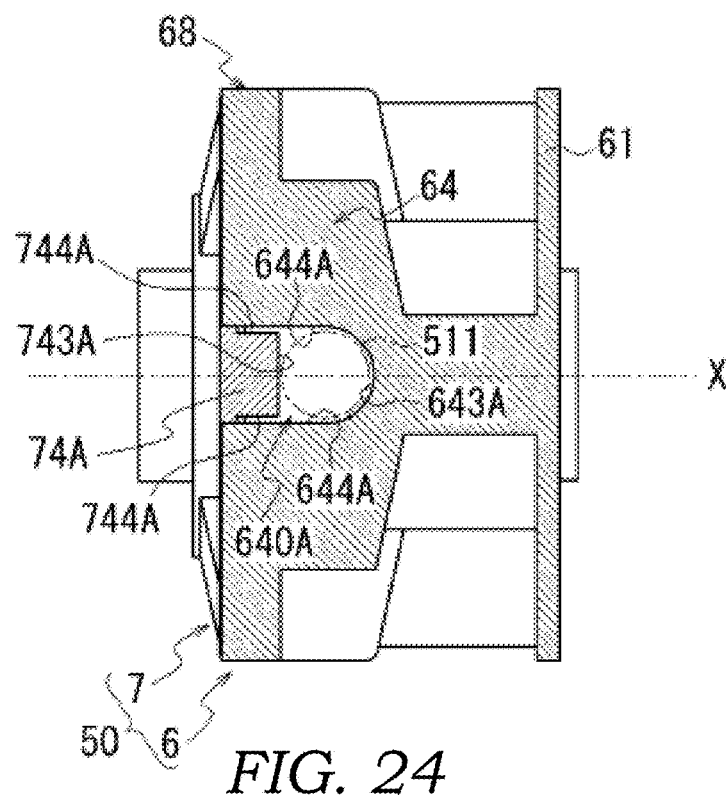
FIG. 24 is a parts diagram illustrating the assembly of the case member 6 and the case member 7 according to the first modification.

FIG. 24 is a parts diagram illustrating the assembly of case members 6 and 7 in deformation example 1.

FIG. 23 shows the state before assembly, and FIG. 24 shows the state after assembly.

As shown in FIG. 23, in deformation example 1, the case member 6 has a recess 640A that recesses in the direction of the rotation axis X. The case member 7 has a connecting portion 74A which is a protrusion in the direction of the rotation axis X. However, in deformation example 1, a support groove for supporting the shaft member 511 is not formed in the recess 640A and the connecting portion 74A.

The recess 640A of the case member 6 has a bottom surface portion 643A and side wall portions 644A which connect to both ends in the circumferential direction around the rotation axis X of the bottom surface portion 643A.

In deformation example 1, the bottom surface portion 643A is formed in a cross-sectional arc shape along the outer diameter of the shaft member 511.

The connecting portion 74A of the case member 7 has a leading end surface 743A and side wall portions 744A. The side wall portions 744A are connected to both ends in the circumferential direction around the rotation axis X of the leading end surface 743A.

The width W10 of the circumferential direction of the recess 640A is set larger than the width W20 of the circumferential direction of the connecting portion 74A. That is, the connecting portion 74A can be inserted into the recess 640A. Here, the width W10 means the length from one side wall portion 644A connected to the bottom surface portion 643A to the other side wall portion 644A. The width W20 means the length from one side wall portion 744A connected to the leading end surface 743A to the other side wall portion 744A.

The length L20 of the connecting portion 74A in the direction of the rotation axis X matches the length L10 shown in the case member 6. The length L10 means the length from the tangent line Im10 passing through the outer peripheral edge closest to the case member 7 of the shaft member 511 to the end on the case member 7 side of the side wall portion 644A.

As shown in FIG. 23, the assembly of the case members 6 and 7 can be performed by placing the shaft member 511 in advance in the recess 640A of the case member 6.

The shaft member 511 is placed in contact with the bottom surface portion 643A. When the connecting portion 74A is inserted into the recess 640A, the leading end surface 743A of the connecting portion 74A comes into contact with the outer peripheral edge of the shaft member 511. The shaft member 511 is supported in the recess 640A in a state of being sandwiched between the bottom surface portion 643A and the leading end surface 743A (refer to FIG. 24).

In this way, in the deformation example 1, the power transmission device 1 has a connecting portion 74A (protrusion) that protrudes in the direction of the rotation axis X and is provided in the case member 7, and a recess 640A that is provided in the case member 6 and sinks in the direction of the rotation axis X. The shaft member 511 is supported by the connecting portion 74A in the recess 640A.

This configuration improves the degree of freedom in assembly, as in the embodiment.

In the embodiments of the present invention, an example of applying the power transmission device to a vehicle is illustrated. However, the present invention is not limited to this embodiment. The power transmission device can also be applied to something other than a vehicle.

The embodiments of the present invention have been described above, but the above embodiments merely illustrate one application example of the present invention, and are not intended to limit the technical scope of the present invention to the specific configuration of the above embodiments. Within the scope of the technical idea of the invention, modifications can be made as appropriate.

DESCRIPTION OF REFERENCE SIGNS 1 power transmission device
6 case member (second case member)
6A first portion
6B second portion
7 case member (first case member)
50 differential case (case)
51 pinion mate shaft
511 shaft member
510 central member
56 oil passage
63a step portion
65 support groove (second cutout portion)
640 recess
71 base (plate)
74 connecting portion (protrusion)
743 leading end surface (leading end)
75 support groove (first cutout portion)
79 step portion
X rotation axis (axis)

The present application claims a priority of Japanese Patent Application No. 2021-046564 filed with the Japan Patent Office on Mar. 19, 2021, all the contents of which are hereby incorporated by reference.

The invention claimed is:

1. A power transmission device comprising
a case assembled by assembling a first case member and a second case member, and
a shaft member supported by the case, wherein
the first case member has a protrusion protruding in an axial direction along an assembly direction of the case,
the second case member has a recess recessed in the axial direction,
the shaft member is supported by the protrusion in the recess, and
an oil passage between the recess and the protrusion in a circumferential direction of the case.

2. The power transmission device according to claim 1, wherein
the first case member has a first cutout portion at a leading end of the protrusion, and the shaft member is accommodated in the first cutout portion.

3. The power transmission device according to claim 1, wherein
the second case member has a second cutout portion for accommodating the shaft member in the recess.

4. The power transmission device according to claim 1, wherein
the oil passage has an elongated shape extending in the axial direction.

5. The power transmission device according to claim 1, comprising a plurality of the shaft members.

6. The power transmission device according to claim 5, comprising three or more of the shaft members.

7. A power transmission device comprising
a case assembled by assembling a first case member and a second case member, and
a shaft member supported by the case, wherein
the first case member has a protrusion protruding in an axial direction along an assembly direction of the case,
the second case member has a recess recessed in the axial direction,
the shaft member is supported by the protrusion in the recess, wherein
the power transmission device comprises a pinion mate gear located between the first case member and the second case member,
the pinion mate gear is supported on the shaft member,
the power transmission device comprises a pinion mate shaft composed of the shaft member and a central member supporting the shaft member,
the central member and the shaft member is integrally molded, and
the shaft member is assembled to the second case member while supporting the pinion mate gear.

8. A power transmission device comprising
a case assembled by assembling a first case member and a second case member, and
a shaft member supported by the case, wherein
the first case member has a protrusion protruding in an axial direction along an assembly direction of the case,
the second case member has a recess recessed in the axial direction,
the shaft member is supported by the protrusion in the recess, and
the first case member has a plate that is connected to the protrusion and fits into the second case member.

9. The power transmission device according to claim 8, wherein
the first case member has a step portion provided on an outer circumferential surface at a boundary between the plate and the protrusion, and
a diameter of the outer circumferential surface on the plate side in the step portion is smaller than a diameter of the outer circumferential surface on the protrusion side.

10. The power transmission device according to claim 9, wherein
the second case member has a first portion on the side of the first case member and a second portion on the side away from the first case member, and
a step portion is provided on an outer peripheral surface at a boundary between the first portion and the second portion.

* * * * *